United States Patent [19]

Himeno et al.

[11] Patent Number: 5,332,404

[45] Date of Patent: Jul. 26, 1994

[54] DISPERSE DYE MIXTURES

[75] Inventors: Kiyoshi Himeno, Munakata; Toshio Hihara, Kitakyushu; Hirotsugu Tsumura, Kitakyushu; Yoshiharu Hamano, Kitakyushu, all of Japan

[73] Assignee: Hoechst Mitsubishi Kasei Co., Ltd., Tokyo, Japan

[21] Appl. No.: 988,813

[22] Filed: Dec. 10, 1992

[30] Foreign Application Priority Data

| Dec. 13, 1991 | [JP] | Japan | 3-330726 |
| Jun. 18, 1992 | [JP] | Japan | 4-159784 |
| Jul. 10, 1992 | [JP] | Japan | 4-183822 |
| Oct. 2, 1992 | [JP] | Japan | 4-265191 |

[51] Int. Cl.$^5$ .................................. C09B 67/22
[52] U.S. Cl. ................................ 8/639; 8/641; 8/643; 8/922
[58] Field of Search .......... 8/639, 640, 641, 642, 8/643, 922

[56] References Cited

U.S. PATENT DOCUMENTS

| 3,950,321 | 4/1976 | Dehnert et al. | |
| 4,128,545 | 12/1978 | Dehnert et al. | |
| 4,354,969 | 10/1982 | Henning et al. | 8/639 |
| 4,432,770 | 2/1984 | Hasler et al. | 8/639 |
| 4,479,899 | 10/1984 | Hamprecht | 8/639 |
| 5,045,084 | 9/1991 | Walker | 8/639 |

FOREIGN PATENT DOCUMENTS

| 0022981 | 1/1981 | European Pat. Off. |
| 0433693 | 6/1991 | European Pat. Off. |
| 2062717 | 6/1972 | Fed. Rep. of Germany |
| 2211663 | 9/1973 | Fed. Rep. of Germany |
| 2512365 | 9/1976 | Fed. Rep. of Germany |
| 2118075 | 7/1972 | France |
| 61-39347 | 9/1986 | Japan |

Primary Examiner—Paul Lieberman
Assistant Examiner—Margaret Einsmann
Attorney, Agent, or Firm—Oblon, Spivak, McClelland, Maier & Neustadt

[57] ABSTRACT

A disperse dye mixture comprising a monoazo dye of the following formula (1) and a monoazo dye of the following formula (2) blended thereto in an amount of from 0.1 to 10 times by weight of the dye of the formula (1):

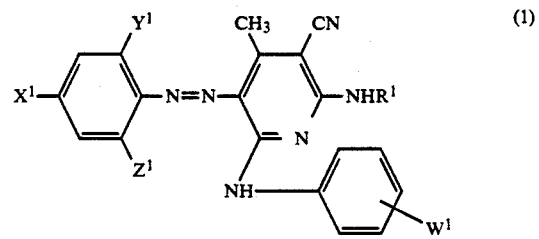

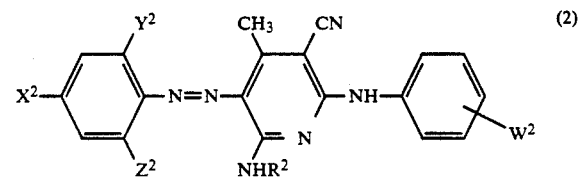

wherein each of $X^1$ and $X^2$ which are independent of each other, is nitro, cyano, sulfomethyl or halogen, each of $Y^1$, $Y^2$, $Z^1$ and $Z^2$ which are independent of one another, is hydrogen, cyano, nitro, trifluoromethyl, halogen or sulfomethyl, each of $W^1$ and $W^2$ which are independent of each other, is hydrogen, halogen, $C_1$-$C_2$ alkyl or alkoxy, and each of $R^1$ and $R^2$ which are independent of each other, is $C_1$-$C_4$ alkyl, or $C_2$-$C_4$ alkyl which is substituted by cyano, halogen, hydroxy, hydroxyalkoxy, $C_1$-$C_4$ alkyl, hydroxyalkoxyalkoxy, acyloxyalkoxy, acyloxyalkoxyalkoxy or alkoxyalkoxy.

13 Claims, No Drawings

DISPERSE DYE MIXTURES

The present invention relates to a disperse dye mixture which is excellent particularly in both the light-fastness and temperature dependency and which is capable of dyeing polyester fibers in an excellent orange to reddish blue color and a dye mixture having blended to such a disperse dye mixture yellow and blue disperse dyes or a red disperse dye.

As automobile seat material, cloths made of polyester fibers have been commonly employed. In recent years, along with the trend for fashionable automobile interior designs, the colors of automobile seats are desired to be colorful. However, the automobile seats are frequently exposed to direct sunlight at high temperatures in closed compartments, whereby seats are likely undergo color fading, and it is difficult to have beautiful colors maintained for a long period of time. Accordingly, as a dye to be used for dyeing polyester fibers for automobile seats, it is desired to employ the one excellent in both the light fastness and temperature dependency.

However, heretofore, there have been available little dyes which are excellent in both the light-fastness and temperature dependency, and there has been no dye found to be fully satisfactory as a dye for the automobile seats.

For example, the following compounds (A) to (D) are known in Examples 261, 121, 110 and 46, respectively, of Japanese Examined Patent Publication No. 39347/1986. These dyes are excellent in the light-fastness, but their dyeing temperature dependency and dyeing affinity are inadequate when they are used alone.

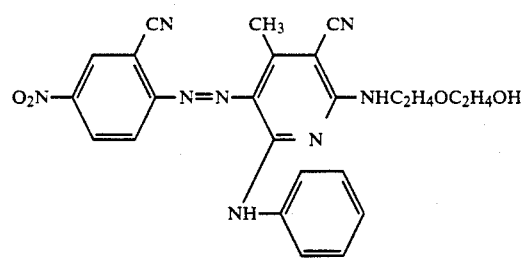
(A)

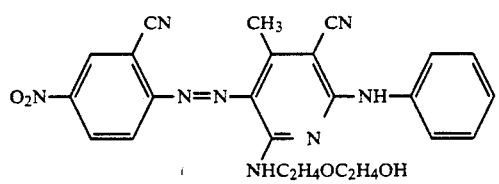
(B)

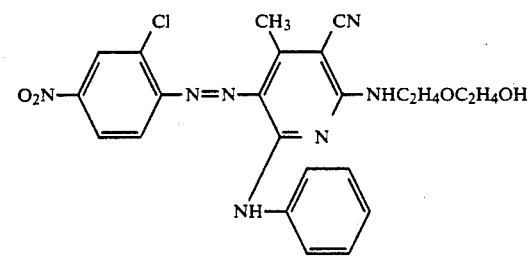
(C)

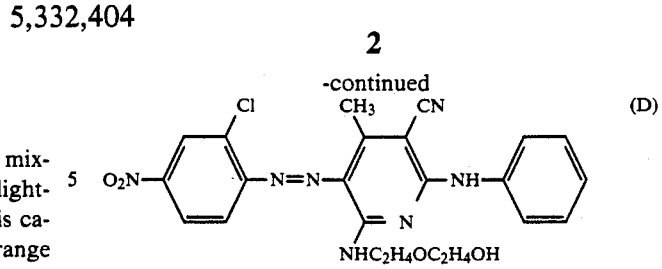
(D)

On the other hand, dyes having the following formulas (E) to (G) are, for example, known as disperse dyes which are excellent in the light-fastness and sublimation fastness when used alone. However, a disperse dye mixture for a practical color such as brown or gray prepared by mixing a yellow disperse dye of the following formula (E), a red disperse dye of the following formula (F) and a blue disperse dye of the following formula (G), is very poor in the light-fastness. For the practical purpose, it is therefore desired that dyes may be mixed to obtain a mixture which does not undergo a deterioration of the light-fastness.

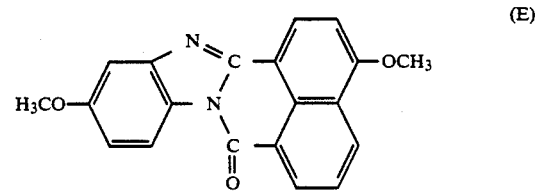
(E)

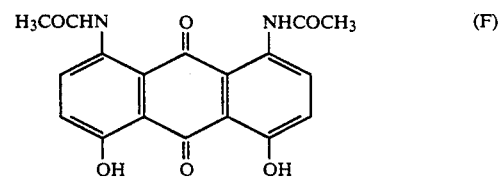
(F)

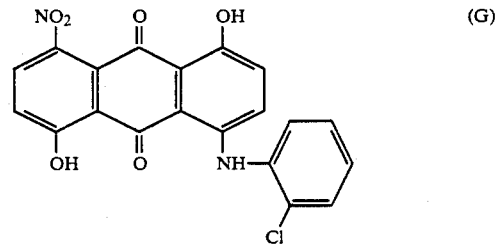
(G)

A red color covers a wide range of hues from yellowish red to bluish red. To obtain a particular hue, it is often required to blend a red disperse dye with another red disperse dye. In such a case, if an optional red disperse dye is blended, the light-fastness or sublimation fastness will be impaired. Therefore, it is desired to have a mixture whereby the color hue can be adjusted within a wide range while maintaining the light-fastness and sublimation fastness.

Under these circumstances, the present inventors have conducted various studies to present a disperse dye which is excellent in both the light-fastness and temperature dependency and which is suitable for dyeing polyester fibers for automobile seats, and as a result, they have found that the above object can be accomplished by a specific dye mixture of the present invention.

Namely, the present inventors have conducted various studies on a method for improving the temperature dependency and dyeing affinity of a certain orange to reddish blue disperse dye while maintaining its lightfastness, and as a result, they have found that when this dye is used in combination with another specific orange to reddish blue dye in the form of a mixture, the dyeing properties can be improved remarkably over the single use. The present invention has been accomplished on the basis of this discovery.

Thus, in a first aspect, the present invention provides a disperse dye mixture comprising a monoazo dye of the following formula (1) and a monoazo dye of the following formula (2) blended thereto in an amount of from 0.1 to 10 times by weight of the dye of the formula (1):

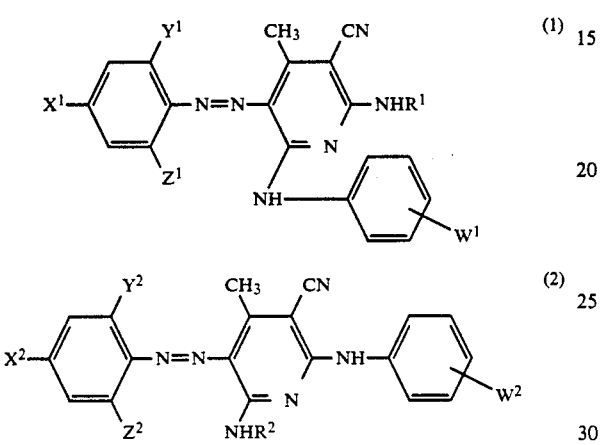

wherein each of $X^1$ and $X^2$ which are independent of each other, is nitro, cyano, sulfomethyl or halogen, each of $Y^1$, $Y^2$, $Z^1$ and $Z^2$ which are independent of one another, is hydrogen, cyano, nitro, trifluoromethyl, halogen or sulfomethyl, each of $W^1$ and $W^2$ which are independent of each other, is hydrogen, halogen, $C_1$-$C_2$ alkyl or alkoxy, and each of $R^1$ and $R^2$ which are independent of each other, is $C_1$-$C_4$ alkyl, or $C_2$-$C_4$ alkyl which is substituted by cyano, halogen, hydroxy, hydroxyalkoxy, $C_1$-$C_4$ alkoxy, hydroxyalkoxyalkoxy, acyloxyalkoxy, acyloxyalkoxyalkoxy or alkoxyalkoxy.

Further, a disperse dye mixture obtained by blending a certain yellow disperse dye and a certain blue disperse dye to the orange to reddish blue disperse dye mixture of the monoazo dyes of the above formulas (1) and (2), has been found to have particularly excellent light fastness. A second aspect of the present invention has been accomplished on the basis of this discovery.

Thus, in the second aspect, the present invention provides a disperse dye mixture comprising 100 parts by weight of the mixture of a monoazo dye of the formula (1) and a monoazo dye of the formula (2) as defined above, from 2 to 2,000 parts by weight of at least one yellow disperse dye selected from the group consisting of dyes of the following formulas (3) to (7) and from 2 to 2,000 parts by weight of at least one blue disperse dye selected from the group consisting of dyes of the following formulas (8) to (10):

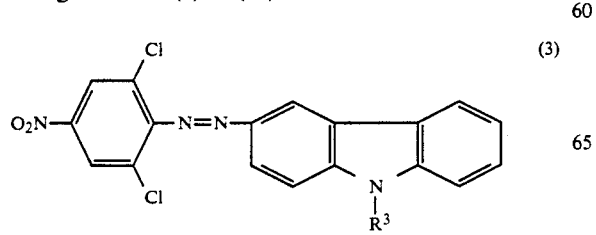

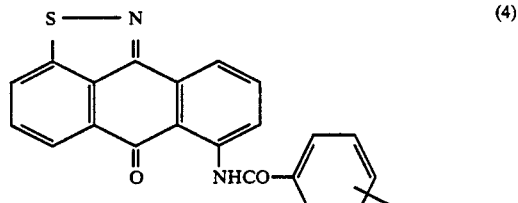

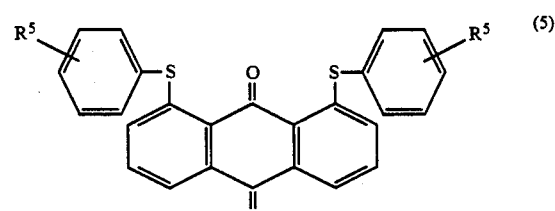

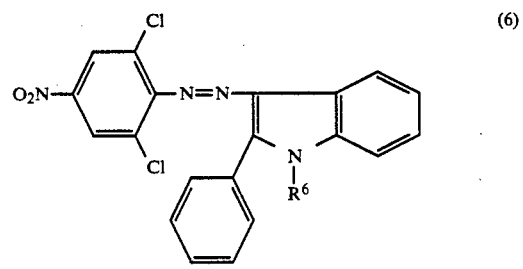

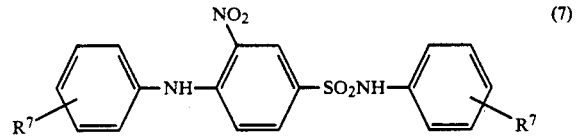

wherein $R^3$ in the formula (3) is $C_2$-$C_3$ alkyl which is substituted by hydroxy or cyano, $R^4$ in the formula (4) is hydrogen, methyl or halogen, $R^5$ in the formula (5) is hydrogen or methyl, $R^6$ in the formula (6) is $C_1$-$C_3$ alkyl which is unsubstituted or substituted by hydroxy or cyano, and $R^7$ in the formula (7) is hydrogen or $C_1$-$C_2$ alkyl;

Formula (8) to Formula (10)

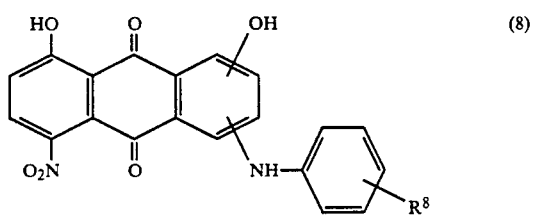

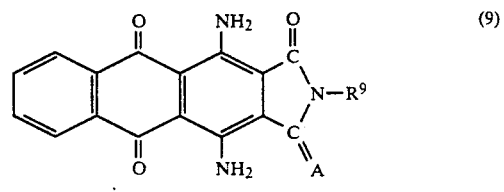

-continued

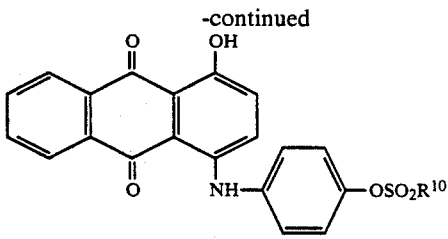  (10)

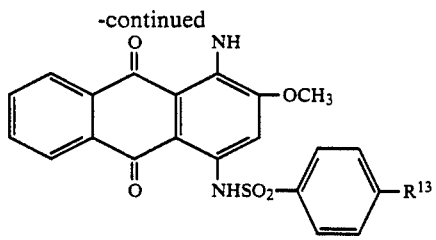

wherein $R^8$ in the formula (8) is hydrogen, halogen, hydroxy or hydroxy $C_2$-$C_3$ alkyl, A in the formula (9) is oxygen or —NH—, $R^9$ in the formula (9) is lower alkoxy lower alkyl or lower alkoxy lower alkoxy lower alkyl, and $R^{10}$ in the formula (10) is $C_1$-$C_2$ alkyl.

Furthermore, a red disperse dye mixture obtained by blending a certain specific red disperse dye to the orange to reddish blue disperse dye mixture of the monoazo dyes of the above formulas (1) and (2), has been found to retain the excellent light-fastness and sublimation fastness. A third aspect of the present invention has been accomplished on the basis of this discovery.

Thus, in the third aspect, the present invention provides a disperse dye mixture comprising 100 parts by weight of the mixture of a monoazo dye of the formula (1) and a monoazo dye of the formula (2) as defined above and from 1 to 100 parts by weight of at least one red disperse dye selected from the group consisting of dyes of the following formulas (11) to (14):

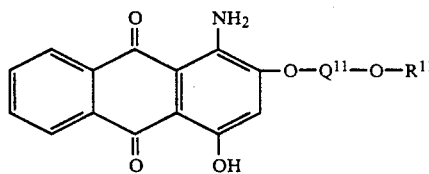 (11)

wherein $Q^{11}$ is $C_2$-$C_6$ alkylene, and $R^{11}$ is hydrogen, phenyl, $$-\underset{\underset{O}{\|}}{C}CH_3 \text{ or } -\underset{\underset{O}{\|}}{C}\text{—}C_6H_5;$$  (12)

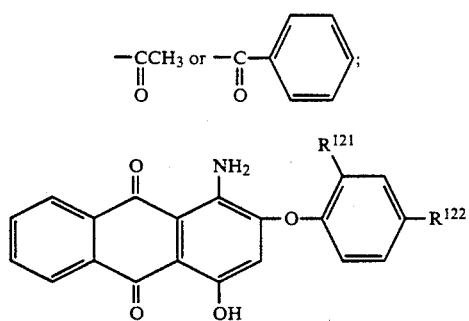

wherein $R^{121}$ is hydrogen or methyl, and $R^{122}$ is $-SO_2NHC_3H_6OC_2H_5$, $-C_2H_4COOCH_3$ or  (13)

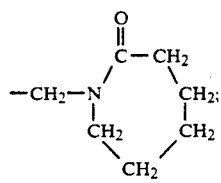

wherein $R^{13}$ is hydrogen or lower alkyl;

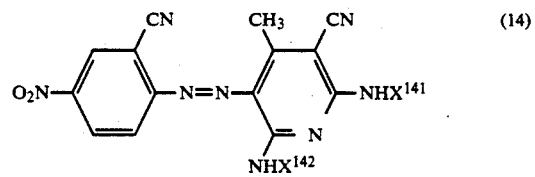 (14)

wherein each of $X^{141}$ and $X^{142}$ which are independent of each other, is —$Q^{14}$—OH or —$Q^{14}$—O—$Q^{14}$—O—$R^{14}$, wherein $Q^{14}$ is $C_2$-$C_3$ alkylene and $R^{14}$ is hydrogen, lower alkyl or phenyl.

Now, the present invention will be described in detail with reference to the preferred embodiments.

In the first aspect of the present invention, the disperse dyes of the formulas (1) and (2) are used in combination as a mixture. The blending ratio is such that the dye of the formula (2) is in an amount of from 0.1 to 10 times by weight, preferably from 0.3 to 4 times by weight, of the dye of the formula (1). If the amount of the dye of the formula (2) is too small or too large, the effects for improving the dyeing affinity and temperature dependency are low. The dye of the formula (2) to be blended to the dye of the formula (1) may be a single dye or a mixture of dyes of the formula (2).

In the above formulas (1) and (2), $X^1$ and $X^2$ independently represent nitro, cyano, sulfomethyl or halogen. The halogen is preferably chlorine or bromine. $X^1$ and $X^2$ are preferably the same. It is particularly preferred that $X^1$ and $X^2$ are nitro Each of $Y^1$, $Y^2$, $Z^1$ and $Z^2$ which are independent of one another, is hydrogen, cyano, nitro, trifluoromethyl, halogen or sulfomethyl. $Y^1$, $Y^2$, $Z^1$ and $Z^2$ may be the same or different. It is particularly preferred that $Y^1$ and $Y^2$ are the same and $Z^1$ and $Z^2$ are the same. The halogen for $Y^1$, $Y^2$, $Z^1$ and $Z^2$ is preferably chlorine or bromine. A combination of $X^1$ and $X^2$ being nitro, $Y^1$ and $Y^2$ being cyano and $Z^1$ and $Z^2$ being hydrogen is preferred. Each of $W^1$ and $W^2$ which are independent of each other, is halogen, $C_1$-$C_2$ alkyl or alkoxy. Particularly preferred is hydrogen.

Each of $R^1$ and $R^2$ which are independent of each other, is $C_1$-$C_4$ alkyl, or $C_2$-$C_4$ alkyl which is substituted by cyano, halogen, hydroxy, hydroxyalkoxy, $C_1$-$C_4$ alkoxy, hydroxyalkoxyalkoxy, acyloxyalkoxy, acyloxyalkoxyalkoxy or alkoxyalkoxy. Specifically, $C_1$-$C_4$ alkyl may, for example, be methyl, ethyl or straight chain or branched propyl or butyl. $C_2$-$C_4$ alkyl substituted by cyano, halogen or hydroxy, may, for example, be cyanoethyl, chloroethyl, bromoethyl, hydroxyethyl, cyanopropyl, chloropropyl, bromopropyl, hydroxypropyl or hydroxybutyl. $C_2$-$C_4$ alkyl substituted by hydroxyalkoxy, hydroxyalkoxyalkoxy, acyloxyalkoxy or acyloxyalkoxyalkoxy, may, for example, be hydroxyethoxyethyl, hydroxyethoxybutyl, hydroxypropoxyethyl, hydroxypropoxypropyl, hydroxybutoxyethyl, hydroxyethoxyethyl, hydroxypropoxypropoxypropyl, formyloxyethoxyethyl, acetyloxyethoxyethyl, propionyloxyethyl, acetyloxypropoxypropyl or acetyloxypropoxypropoxypropyl. $C_1$-$C_4$ alkyl substituted by $C_1$-$C_4$ alkoxy, may, for example, be methoxyethyl, butoxyethyl, ethoxypropyl, propoxypropyl or methoxybutyl. $C_2$-$C_4$ alkyl substituted by alkoxyalkoxy, may, for example, be methoxyethoxypropyl or ethoxyethoxyethyl.

A preferred blending ratio is such that the dye of the formula (2) is in an amount of from 0.25 to 4 times by weight of the dye of the formula (1). In a case where in the above formulas (1) and (2), $R^1$ and $R^2$ are both hydroxyethyl, a particularly preferred blending ratio is such that the dye of the formula (2) is in an amount of from 1.5 to 4 times by weight of the dye of the formula (1). Within such a range of the blending ratio, a particularly remarkable improvement is observed in the dyeing affinity and temperature dependency.

On the other hand, in the second aspect, the present invention provides a dye mixture prepared by blending at least one yellow disperse dye selected from the group consisting of dyes of the formulas (3) to (7) and at least one blue disperse dye selected from the group consisting of dyes of the formulas (8) to (10) to the orange to reddish blue disperse dye mixture of the monoazo dyes of the formulas (1) and (2), as mentioned above.

In the compound of the formula (3), $R^3$ may specifically be $C_2H_4OH$, $-CH_2CH(CH_3)OH$, $-C_3H_6OH$, $-C_2H_4CN$ or $-C_3H_6CN$. Particularly preferred is $-C_2H_4OH$ or $-C_2H_4CN$.

In the compounds of the above formulas (4) and (8), the halogen for $R^4$ or $R^8$ may, for example, be fluorine, chlorine or bromine. Particularly preferred is chlorine or bromine.

In the compound of the formula (6), $R^6$ may specifically be methyl, ethyl, n-propyl, i-propyl, $-C_2H_4OH$, $-C_2CH(CH_3)OH$, $-C_3H_6OH$, $-C_2H_4CN$ or $-C_3H_6CN$.

Particularly preferred is $-C_2H_4OH$ or $-C_2H_4CN$.

In the compound of the formula (7) or (10), $C_1$-$C_2$ alkyl for $R^7$ or $R^{10}$ is methyl or ethyl.

In the above formula (8), hydroxy $C_2$-$C_3$ lower alkyl for $R^8$ is hydroxy lower alkyl such as $-C_2H_4OH$ or $-C_3H_6OH$. Particularly preferred is $-C_2H_4OH$.

In the formula (9), $R^9$ may be lower alkoxy lower alkyl such as $-C_3H_6OCH_3$ or $-C_3H_6OC_3H_7$, or lower alkoxy lower alkoxy lower alkyl such as $-C_2H_4OC_2H_4OC_2H_5$ or $-C_2H_4OC_2H_4OCH_3$. Preferred is lower alkoxy lower alkyl.

The blending ratio for the disperse dye mixture in the second aspect of the present invention is such that at least one yellow disperse dye selected from the group consisting of dyes of the formulas (3) to (7) is in a total amount of from 2 to 2,000 parts by weight, preferably from 10 to 1,000 parts by weight, and at least one blue disperse dye selected from the group consisting of dyes of the formulas (8) to (10) is in a total amount of from 2 to 2,000 parts by weight, preferably from 10 to 1,000 parts by weight, per 100 parts by weight of the orange to reddish blue disperse dye mixture of the monoazo dyes of the formulas (1) and (2).

The most preferred blending ratio is such that the yellow disperse dye is from 30 to 500 parts by weight and the blue disperse dye is from 30 to 500 parts by weight, per 100 parts by weight of the above orange to reddish blue disperse dye mixture.

In the third aspect, the present invention provides a dye mixture prepared by blending at least one red disperse dye selected from the group consisting of dyes of the above formulas (11) to (14) to the orange to reddish blue disperse dye mixture of the monoazo dyes of the formulas (1) and (2).

In the compound of the formula (11), $C_2$-$C_6$ alkylene for $Q^{11}$ may, for example, be $-CH_2CH_2-$, $-CH_2CH_2CH_2-$, $-(CH_2)_4-$ or $-(CH_2)_6-$.

In the compound of the formula (13) or (14), lower alkyl for $R^{13}$ or $R^{14}$ may, for example, be methyl, ethyl, n-propyl, i-propyl, or linear or branched butyl.

In the compound of the formula (14), $C_2$-$C_3$ alkylene for $Q^{14}$ may be $-CH_2CH_2-$ or $-CH_2CH_2CH_2-$.

The blending ratio for the disperse dye mixture in the third aspect of the present invention is such that at least one red disperse dye selected from the group consisting of dyes of the formulas (11) to (14) is in an amount of from 1 to 100 parts by weight, preferably from 20 to 60 parts by weight, per 100 parts by weight of the orange to reddish blue disperse dye mixture of the monoazo dyes of the formulas (1) and (2).

The disperse dyes of the formulas (1) and (2) can be prepared in accordance with the method disclosed in Japanese Examined Patent Publication No. 39347/1986. With respect to the blending method, the respective dyes of independent structures may be mixed to obtain the dye mixture. Otherwise, such a mixture may be obtained by mixing at least two coupling components during the synthesis of the dyes, followed by a coupling reaction.

The disperse dyes of the formulas (3) to (10) are per se known, and can be prepared in accordance with known methods.

The disperse dyes of the formulas (11) to (14) are also per se known, for example, in Japanese Examined Patent Publications No. 3299/1963, No. 14316/1965, No. 18179/1968 and No. 1039/1963 and can be prepared in accordance with known methods.

Fibers which can be dyed by the disperse dye mixture of the present invention, may, for example, be polyester fibers made of e.g. polyethylene terephthalate or a polycondensation product of terephthalic acid and 1,4-bis(-hydroxymethyl)cyclohexane, or blended yarn products or combined filament yarn products of such polyester fibers with other fibers such as cotton, silk, wool, rayon, polyamide or polyurethane. In a case where the fibers are polyester fibers for automobile seats, polyester fibers of from 2 to 5 deniers are preferred, and in a case of fine denier polyester cloths for clothings, polyester fibers of from 0.1 to 1 denier are preferred.

The disperse dye mixture of the present invention is insoluble or hardly soluble in water. Accordingly, to dye the polyester fibers with the disperse dye mixture of the present invention, a dye bath or a printing paste is prepared by dispersing the mixture in an aqueous medium by using a dispersing agent such as a condensation product of naphthalene sulfonic acid with formaldehyde, a higher alcohol sulfuric acid ester or a higher alkylbenzene sulfonate in accordance with a conventional method, followed by dip dyeing or textile printing.

In the case of dip dyeing, a conventional dyeing treatment such as a high temperature dyeing method, a carrier dyeing method or a thermosol dyeing method, may be applied, whereby polyester fibers or blended yarn products thereof can be dyed with excellent fastness. Better results may sometimes be obtained by adding a known acidic substance such as formic acid, acetic acid, phosphoric acid or ammonium sulfate to the dye bath.

The pH of the dye bath is usually preferably adjusted within a range of from 5.0 to 9.5. The dyeing temperature may, for example, be at a level of from 120 to 140° C. Especially when used for exhaustion dyeing, the disperse dye mixture of the present invention exhibits excellent dyeing affinity and temperature dependency.

There is no particular restriction as to the dyeing conditions for exhaustion dyeing. For example, the dyeing temperature is at a level of from 120 to 140° C., the dyeing time is from 30 to 60 minutes, and the pH of the dye bath is at a level of from 4.0 to 9.5.

Further, at the time of dyeing, various leveling agents and/or ultraviolet absorbers may be used in combination.

According to the present invention, by blending to a dye of the formula (1) a dye of the formula (2) having a structure similar thereto, it is possible to remarkably improve the temperature dependency and dyeing affinity while maintaining the excellent light-fastness, as compared with a case where the respective dyes are used independently.

Further, the disperse dye mixture having the specific yellow and blue disperse dyes or the specific red disperse dye mixed to the mixture of the dyes of the formulas (1) and (2), is excellent in the light-fastness and sublimation fastness and is very useful.

Now, the present invention will be described in further detail with reference to Examples. However, it should be understood that the present invention is by no means restricted by such specific Examples.

EXAMPLES 1 TO 17 AND COMPARATIVE EXAMPLES 1 TO 17

1 g of one of red disperse dyes (1-1) to (1-12) as identified in Table 1, one of red disperse dyes (2-1) to (2-12) as identified in Table 2 or a dye mixture having a dye in Table 1 and a dye in Table 2 blended in the proportions as identified in Table 3, was dispersed in 3 l of water containing 1 g of a naphthalene sulfonic acid-formaldehyde condensation product and 2 g of a higher alcohol sulfuric acid ester to obtain a dye bath. In this dye bath, 100 g of polyester fibers were dipped and dyed at 130° C. for 60 minutes, followed by soaping, washing with water and drying to obtain a red dyed cloth. The light-fastness, sublimation fastness and water fastness of the dyed cloth as well as the temperature stability and pH stability of the above dye during the dyeing operation were excellent in each case.

Further, the dye tinted to the cloth was dissolved and extracted with a 0.1% phosphoric acid solution in dimethylformamide and subjected to colorimetry, whereupon the tinted dye density (relative value) of each cloth in each Example was calculated on the basis of the tinted density of Test No. 1-1 in Example No. 1 being 100 (standard) and shown in Table 3. Further, with respect to a cloth dyed under the same dyeing conditions as described above except that the dyeing temperature was changed to 120° C., the tinted dye density was calculated in the same manner, whereupon the temperature dependency was determined in accordance with the following formula.

The results are shown in Table 3.

Temperature dependency (%) = (Tinted dye density when dyed at 120° C. for 60 minutes / Tinted dye density when dyed at 130° C. for 60 minutes) × 100

TABLE 1

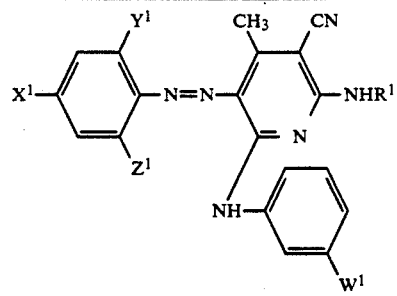

| Dye No. | $R^1$ | $X^1$ | $Y^1$ | $Z^1$ | $W^1$ |
|---|---|---|---|---|---|
| [1-1] | $C_2H_4OC_2H_4OH$ | $NO_2$ | CN | H | H |
| [1-2] | $C_2H_4OH$ | $NO_2$ | CN | H | H |
| [1-3] | $C_3H_6OH$ | $NO_2$ | CN | H | H |
| [1-4] | $C_4H_8OH$ | $NO_2$ | CN | H | H |
| [1-5] | $C_3H_6OCH_3$ | $NO_2$ | CN | H | H |
| [1-6] | $C_3H_6OC_2H_5$ | $NO_2$ | CN | H | H |
| [1-7] | $C_3H_6OC_3H_7(i)$ | $NO_2$ | CN | H | H |
| [1-8] | $C_2H_4OCH_3$ | $NO_2$ | CN | H | H |
| [1-9] | $C_2H_4OC_4H_9$ | $NO_2$ | CN | H | H |
| [1-10] | $CH_3$ | $NO_2$ | CN | H | H |
| [1-11] | $C_2H_5$ | $NO_2$ | CN | H | H |
| [1-12] | $C_4H_9(n)$ | $NO_2$ | CN | H | H |

TABLE 2

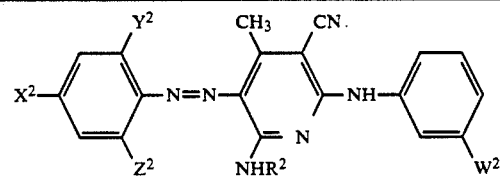

| Dye No. | $R^2$ | $X^2$ | $Y^2$ | $Z^2$ | $W^2$ |
|---|---|---|---|---|---|
| [2-1] | $C_2H_4OC_2H_4OH$ | $NO_2$ | CN | H | H |
| [2-2] | $C_2H_4OH$ | $NO_2$ | CN | H | H |
| [2-3] | $C_3H_6OH$ | $NO_2$ | CN | H | H |
| [2-4] | $C_4H_8OH$ | $NO_2$ | CN | H | H |
| [2-5] | $C_3H_6OCH_3$ | $NO_2$ | CN | H | H |
| [2-6] | $C_3H_6OC_2H_5$ | $NO_2$ | CN | H | H |
| [2-7] | $C_3H_6OC_3H_7(i)$ | $NO_2$ | CN | H | H |
| [2-8] | $C_2H_4OCH_3$ | $NO_2$ | CN | H | H |
| [2-9] | $C_2H_4OC_4H_9$ | $NO_2$ | CN | H | H |
| [2-10] | $CH_3$ | $NO_2$ | CN | H | H |
| [2-11] | $C_2H_5$ | $NO_2$ | CN | H | H |
| [2-12] | $C_4H_9(n)$ | $NO_2$ | CN | H | H |

TABLE 3

| Example No. | Test No. | Dyes used (g) | Tinted dye density | Temperature dependency (%) |
|---|---|---|---|---|
| 1 | 1-1 | (1-1) 1.0 | 100 | 30 |
|   | 1-2 | (2-1) 1.0 | 90 | 30 |
|   | 1-3 | (1-1) 0.5 + (2-1) 0.5 | 125 | 60 |
| 2 | 2-1 | (1-1) 1.0 | 100 | 30 |
|   | 2-2 | (2-2) 1.0 | 80 | 20 |
|   | 2-3 | (1-1) 0.6 + (2-2) 0.4 | 120 | 60 |
| 3 | 3-1 | (1-1) 1.0 | 100 | 30 |
|   | 3-2 | (2-3) 1.0 | 80 | 20 |
|   | 3-3 | (1-1) 0.6 + (2-3) 0.4 | 120 | 55 |
| 4 | 4-1 | (1-1) 1.0 | 100 | 30 |
|   | 4-2 | (2-4) 1.0 | 80 | 20 |
|   | 4-3 | (1-1) 0.6 + (2-4) 0.4 | 120 | 55 |
| 5 | 5-1 | (1-1) 1.0 | 100 | 30 |
|   | 5-2 | (2-5) 1.0 | 100 | 30 |
|   | 5-3 | (1-1) 0.5 + (2-5) 0.5 | 130 | 65 |
| 6 | 6-1 | (1-1) 1.0 | 100 | 30 |

TABLE 3-continued

| Example No. | Test No. | Dyes used (g) | Tinted dye density | Temperature dependency (%) |
|---|---|---|---|---|
| | 6-2 | (2-7) 1.0 | 100 | 30 |
| | 6-3 | (1-1) 0.5 + (2-7) 0.5 | 130 | 65 |
| 7 | 7-1 | (1-1) 1.0 | 100 | 30 |
| | 7-2 | (2-10) 1.0 | 80 | 30 |
| | 7-3 | (1-1) 0.5 + (2-10) 0.5 | 130 | 60 |
| 8 | 8-1 | (1-2) 1.0 | 90 | 30 |
| | 8-2 | (2-1) 1.0 | 100 | 30 |
| | 8-3 | (1-2) 0.5 + (2-1) 0.5 | 125 | 60 |
| 9 | 9-1 | (1-2) 1.0 | 90 | 30 |
| | 9-2 | (2-2) 1.0 | 90 | 30 |
| | 9-3 | (1-2) 0.5 + (2-2) 0.5 | 120 | 55 |
| 10 | 10-1 | (1-2) 1.0 | 90 | 30 |
| | 10-2 | (2-5) 1.0 | 100 | 30 |
| | 10-3 | (1-2) 0.5 + (2-5) 0.5 | 125 | 60 |
| 11 | 11-1 | (1-3) 1.0 | 80 | 20 |
| | 11-2 | (2-1) 1.0 | 100 | 30 |
| | 11-3 | (1-3) 0.5 + (2-1) 0.5 | 120 | 60 |
| 12 | 12-1 | (1-5) 1.0 | 100 | 30 |
| | 12-2 | (2-5) 1.0 | 100 | 30 |
| | 12-3 | (1-5) 0.5 + (2-5) 0.5 | 130 | 70 |
| 13 | 13-1 | (1-6) 1.0 | 100 | 30 |
| | 13-2 | (2-6) 1.0 | 100 | 30 |
| | 13-3 | (1-6) 0.5 + (2-6) 0.5 | 130 | 70 |
| 14 | 14-1 | (1-8) 1.0 | 100 | 30 |
| | 14-2 | (2-8) 1.0 | 100 | 30 |
| | 14-3 | (1-8) 0.5 + (2-8) 0.5 | 130 | 70 |
| 15 | 15-1 | (1-9) 1.0 | 90 | 20 |
| | 15-2 | (2-10) 1.0 | 80 | 20 |
| | 15-3 | (1-9) 0.5 + (2-10) 0.5 | 120 | 50 |
| 16 | 16-1 | (1-10) 1.0 | 80 | 20 |
| | 16-2 | (2-10) 1.0 | 80 | 20 |
| | 16-3 | (1-10) 0.5 + (2-10) 0.5 | 120 | 50 |
| 17 | 17-1 | (1-11) 1.0 | 80 | 20 |
| | 17-2 | (2-11) 1.0 | 80 | 20 |
| | 17-3 | (1-11) 0.5 + (2-11) 0.5 | 120 | 50 |

EXAMPLES 18 TO 23 AND COMPARATIVE EXAMPLE 18

Using red disperse dye No. (1-1) in Table 1 and red disperse dye No. (2-1) in Table 2, experiments were conducted in the same manner as in Examples 1 to 17, except that the blending ratio was changed as identified in Table 4. The results are shown in Table 4.

It is evident from the results of Examples 18 to 20 that with the compounds of the formulas (1) and (2) wherein both $R^1$ and $R^2$ are hydroxyethoxyethyl, the dyeing affinity and temperature dependency are improved when the blending ratio of the compound of the formula (2) to the compound of the formula (1) is within a range of from 1:1.5 to 1:4.

TABLE 4

| | Dyes used (g) | | Tinted dye density | Temperature dependency (%) |
|---|---|---|---|---|
| | (1-1) | (2-1) | | |
| Example 18 | 0.2 | 0.8 | 130 | 75 |
| Example 19 | 0.3 | 0.7 | 135 | 80 |
| Example 20 | 0.4 | 0.6 | 132 | 77 |
| Example 21 | 0.7 | 0.3 | 115 | 50 |
| Example 22 | 0.1 | 0.9 | 114 | 55 |
| Example 23 | 0.8 | 0.2 | 105 | 40 |
| Comparative Example 18 | 0.05 | 0.95 | 92 | 40 |

EXAMPLE 24

140 g of a lignin sulfonic acid-formaline condensation product and 650 g of water were mixed to 60 g of a disperse dye mixture comprising 25 parts by weight of monoazo dye No. (1-1) in Table 1 and 75 parts by weight of monoazo dye No. (2-1) in Table 2, and the mixture was pulverized in a wet system by a sand grinder, followed by spray drying. To 0.07 g of this powdery disperse dye mixture, 0.08 g of a nonionic leveling agent (Diaserver® LR-PSL, manufactured by Mitsubishi Kasei Corporation), 0.10 g of an ultraviolet absorber (Sunlife LP-100, tradename, manufactured by Nikka Kagaku K.K.) and 150 ml of water were added, and the resulding dye bath was adjusted to pH5.5. To the dye bath, 5 g of a polyester cloth was introduced and subjected to exhaustion dyeing at 130° C. for one hour, followed by soaping, washing with water and drying to obtain a red-dyed cloth.

The light-fastness of this dyed cloth was measured by a JIS test method (JIS L-0843) modified for testing automobile seats (the temperature was 89° C.±5° C. a soft polyurethane foam (10 mm) was lined on the rear side of the test cloth, and the fastness was evaluated by the color fading scale stipulated in JIS) and found to be grade 4-5.

EXAMPLE 25

150 ml of water was added to 0.2 g of a powdery disperse dye mixture prepared in accordance with Example 24, and the resulting dye bath was adjusted to pH7. To this dye bath, 5 g of a fine denier polyester cloth (yarn size: 0.8 denier) was introduced and subjected to exhaustion dyeing at 135° C. for 60 minutes, followed by reduction cleaning, washing with water and drying in accordance with conventional methods to obtain a red-dyed cloth. The light-fastness of this cloth was grade 6 (JIS L-0843 method: 40 hr).

EXAMPLES 26 TO 59 AND COMPARATIVE EXAMPLES 26 TO 59

Dyeing and evaluation were conducted in the same manner as in Examples 1 to 17 except that one of the orange to reddish blue disperse dyes as identified in Table 5 or a dye mixture with the composition as identified in Table 5 was used. The light-fastness, sublimation fastness and water fastness of the obtained cloth as well as the temperature stability and the pH dependency during dyeing were excellent in each case. Further, the tinted dye densities and the temperature dependency obtained in the same manner as in Examples 1 to 17 are shown in Table 5. In Table 5, m-Br presented, for example, in the column for W for Example No. 28 means that Br is substituted at the m-position relative to the amino group on the phenylamino group. In the cases presented in Table 5, $X^1$ and $X^2$, $Y^1$ and $Y^2$, $Z^1$ and $Z^2$ and $W^1$ and $W^2$ in the above formulas (1) and (2) are the same, respectively. Accordingly, with respect to the formulas (1') and (2') in Table 5, they were represented simply by X, Y, Z and W, respectively.

TABLE 5

Structure (1'): X-C6H3(Y)(Z)-N=N-C(...)=C(CH3)-C(CN)=C(NHR1)-N=C(-NH-C6H4-W)

Structure (2'): X-C6H3(Y)(Z)-N=N-C(...)=C(CH3)-C(CN)=C(-NH-C6H4-W)-N=C(NHR1)

| Example No. | Test No. | X,Y,Z (phenyl) | −R¹=−R² | −W | Dyes used (1) | Dyes used (2) | Tinted dye density | Temperature dependency (%) | Hue of polyester fibers |
|---|---|---|---|---|---|---|---|---|---|
| 26 | 26-1 | 2-Cl, 4-O2N | −C2H4OC2H4OH | H | 1 | — | 100 | 30 | Red |
|  | 26-2 |  |  |  | — | 1 | 95 | 40 |  |
|  | 26-3 |  |  |  | 0.4 | 0.6 | 120 | 70 |  |
| 27 | 27-1 | 2-Cl, 4-O2N | −C2H4OC2H4OC2H4OH | H | 1 | — | 100 | 35 | Red |
|  | 27-2 |  |  |  | — | 1 | 100 | 45 |  |
|  | 27-3 |  |  |  | 0.3 | 0.7 | 120 | 75 |  |
| 28 | 28-1 | 2-Cl, 4-O2N | −C2H4OC2H4OH | m-Br | 1 | — | 100 | 25 | Red |
|  | 28-2 |  |  |  | — | 1 | 95 | 30 |  |
|  | 28-3 |  |  |  | 0.4 | 0.6 | 120 | 60 |  |
| 29 | 29-1 | 2-Cl, 4-O2N | −C3H6OC2H5 | H | 1 | — | 100 | 30 | Red |
|  | 29-2 |  |  |  | — | 1 | 95 | 30 |  |
|  | 29-3 |  |  |  | 0.5 | 0.5 | 125 | 65 |  |
| 30 | 30-1 | 2-Cl, 4-O2N | −C3H6OC2H4OCH3 | H | 1 | — | 100 | 35 | Red |
|  | 30-2 |  |  |  | — | 1 | 100 | 35 |  |
|  | 30-3 |  |  |  | 0.5 | 0.5 | 115 | 70 |  |
| 31 | 31-1 | 2-Br, 4-O2N | −C2H4CN | H | 1 | — | 100 | 25 | Red |
|  | 31-2 |  |  |  | — | 1 | 95 | 25 |  |
|  | 31-3 |  |  |  | 0.3 | 0.7 | 125 | 50 |  |
| 32 | 32-1 | 2-CN, 4-O2N, 6-Br | −C2H4OC2H4OH | H | 1 | — | 100 | 30 | Bluish Red |
|  | 32-2 |  |  |  | — | 1 | 100 | 35 |  |
|  | 32-3 |  |  |  | 0.5 | 0.5 | 120 | 60 |  |
| 33 | 33-1 | 2-CN, 4-O2N, 6-Br | −C3H6OC3H6OCH(=O) | H | 1 | — | 100 | 40 | Bluish red |
|  | 33-2 |  |  |  | — | 1 | 100 | 40 |  |
|  | 33-3 |  |  |  | 0.4 | 0.6 | 125 | 70 |  |

TABLE 5-continued

| | | | | | | | | | |
|---|---|---|---|---|---|---|---|---|---|
| 34 | 34-1<br>34-2<br>34-3 | 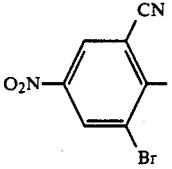 | —C$_3$H$_6$Cl | H | 1<br>—<br>0.5 | —<br>1<br>0.5 | 100<br>100<br>115 | 25<br>25<br>55 | Bluish<br>red |
| 35 | 35-1<br>35-2<br>35-3 | 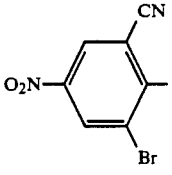 | —C$_3$H$_6$OC$_3$H$_7$(i) | p-OCH$_3$ | 1<br>—<br>0.4 | —<br>1<br>0.6 | 100<br>95<br>115 | 30<br>30<br>65 | Bluish<br>red |
| 36 | 36-1<br>36-2<br>36-3 | 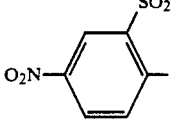 | —C$_4$H$_8$OCH$_3$ | H | 1<br>—<br>0.4 | —<br>1<br>0.6 | 100<br>95<br>120 | 30<br>30<br>60 | Red |
| 37 | 37-1<br>37-2<br>37-3 | 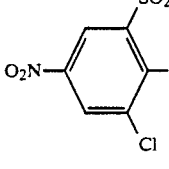 | —C$_2$H$_5$ | H | 1<br>—<br>0.4 | —<br>1<br>0.6 | 100<br>100<br>120 | 25<br>25<br>55 | Bluish<br>red |
| 38 | 38-1<br>38-2<br>38-3 | 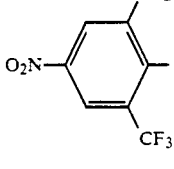 | —C$_2$H$_4$OC$_2$H$_4$OH | H | 1<br>—<br>0.4 | —<br>1<br>0.6 | 100<br>100<br>120 | 30<br>30<br>60 | Bluish<br>red |
| 39 | 39-1<br>39-2<br>39-3 | 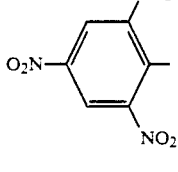 | —C$_3$H$_6$OC$_3$H$_6$OH | H | 1<br>—<br>0.4 | —<br>1<br>0.6 | 100<br>100<br>125 | 20<br>20<br>50 | Bluish<br>red |
| 40 | 40-1<br>40-2<br>40-3 | 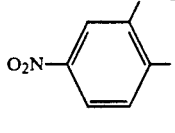 | —C$_2$H$_4$OC$_2$H$_4$OCH<br>$\quad\quad\quad\quad\quad\quad\quad$‖<br>$\quad\quad\quad\quad\quad\quad\quad$O | H | 1<br>—<br>0.4 | —<br>1<br>0.6 | 100<br>100<br>120 | 30<br>30<br>70 | Crimson |
| 41 | 41-1<br>41-2<br>41-3 | 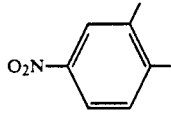 | $\quad\quad\quad\quad\quad\quad\quad$O<br>$\quad\quad\quad\quad\quad\quad\quad$‖<br>—C$_3$H$_6$OC$_3$H$_6$OCC$_3$H$_7$ | H | 1<br>—<br>0.4 | —<br>1<br>0.6 | 100<br>100<br>120 | 30<br>30<br>75 | Crimson |
| 42 | 42-1<br>42-2<br>42-3 | 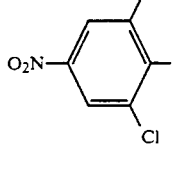 | —C$_4$H$_9$(n) | H | 1<br>—<br>0.3 | —<br>1<br>0.7 | 100<br>95<br>125 | 30<br>30<br>70 | Bluish<br>red |

TABLE 5-continued
| 43 | 43-1 43-2 43-3 | 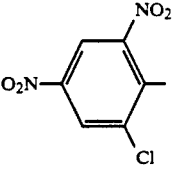 | —C$_3$H$_6$CN | p-Cl | 1 — 0.4 | — 1 0.6 | 100 100 120 | 20 20 50 | Red |
| --- | --- | --- | --- | --- | --- | --- | --- | --- | --- |
| 44 | 44-1 44-2 44-3 | 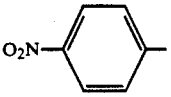 | —C$_3$H$_6$OC$_4$H$_9$(n) | H | 1 — 0.5 | — 1 0.5 | 100 90 115 | 35 35 65 | Orange |
| 45 | 45-1 45-2 45-3 | 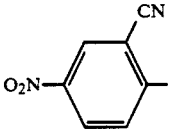 | —C$_2$H$_4$OC$_2$H$_4$OH | m-Cl | 1 — 0.3 | — 1 0.7 | 100 90 125 | 30 30 70 | Red |
| 46 | 46-1 46-2 46-3 | 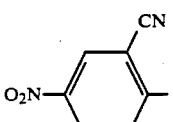 | —C$_2$H$_4$OC$_2$H$_4$OCC$_2$H$_5$ (O) | o-CH$_3$ | 1 — 0.3 | — 1 0.7 | 100 90 125 | 30 30 75 | Red |
| 47 | 47-1 47-2 47-3 | 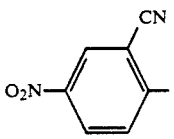 | —C$_2$H$_4$OC$_2$H$_4$OC$_2$H$_5$ | H | 1 — 0.5 | — 1 0.5 | 100 80 120 | 30 30 70 | Red |
| 48 | 48-1 48-2 48-3 | 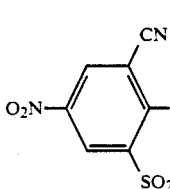 | —C$_3$H$_6$OH | m-OC$_2$H$_5$ | 1 — 0.5 | — 1 0.5 | 100 100 125 | 20 25 50 | Bluish red |
| 49 | 49-1 49-2 49-3 | 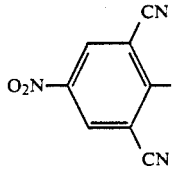 | —C$_2$H$_4$OC$_2$H$_4$OH | H | 1 — 0.4 | — 1 0.6 | 100 100 125 | 35 35 70 | Reddish blue |
| 50 | 50-1 50-2 50-3 | 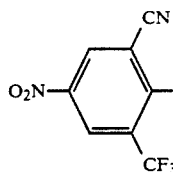 | —C$_3$H$_6$OC$_2$H$_5$ | H | 1 — 0.5 | — 1 0.5 | 100 105 120 | 30 30 65 | Bluish red |
| 51 | 51-1 51-2 51-3 | 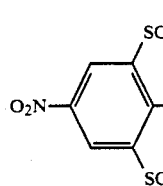 | —C$_3$H$_6$OC$_3$H$_6$OC$_3$H$_6$OCCH$_3$ (O) | H | 1 — 0.5 | — 1 0.5 | 100 100 120 | 35 35 70 | Bluish red |
| 52 | 52-1 52-2 52-3 | 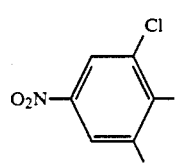 | —C$_2$H$_4$OC$_2$H$_4$OH | H | 1 — 0.4 | — 1 0.6 | 100 100 120 | 35 35 75 | Brownish red |

TABLE 5-continued

| | | Structure | Substituent | | | | | | Color |
|---|---|---|---|---|---|---|---|---|---|
| 53 | 53-1<br>53-2<br>53-3 | 2,4-Cl, 5-NO2 phenyl | —C3H6OC2H5 | H | 1<br>—<br>0.2 | —<br>1<br>0.8 | 100<br>100<br>125 | 35<br>35<br>75 | Brownish red |
| 54 | 54-1<br>54-2<br>54-3 | 2-Cl, 4-CH3SO2 phenyl | —C2H4OC2H4OH | H | 1<br>—<br>0.6 | —<br>1<br>0.4 | 100<br>100<br>115 | 30<br>30<br>50 | Orange |
| 55 | 55-1<br>55-2<br>55-3 | 2,5-Cl, 4-CH3SO2 phenyl | —C2H4OC2H4OH | H | 1<br>—<br>0.3 | —<br>1<br>0.7 | 100<br>100<br>125 | 30<br>30<br>65 | Brown |
| 56 | 56-1<br>56-2<br>56-3 | 2-NO2, 4-CH3SO2 phenyl | —C3H6CN | H | 1<br>—<br>0.3 | —<br>1<br>0.7 | 100<br>100<br>120 | 30<br>30<br>65 | Yellowish red |
| 57 | 57-1<br>57-2<br>57-3 | 2-CN, 4-NO2 phenyl | —C3H6OC2H4OCH3 | H | 1<br>—<br>0.4 | —<br>1<br>0.6 | 100<br>100<br>120 | 35<br>35<br>75 | Red |
| 58 | 58-1<br>58-2<br>58-3 | 2-NO2, 4-CN phenyl | —C2H4OC2H4OH | H | 1<br>—<br>0.4 | —<br>1<br>0.6 | 100<br>100<br>120 | 30<br>30<br>65 | Crimson |
| 59 | 59-1<br>59-2<br>59-3 | 2-NO2, 4-Cl, 5-CN phenyl | —C3H6OC2H4OCH3 | H | 1<br>—<br>0.5 | —<br>1<br>0.5 | 100<br>100<br>120 | 35<br>35<br>65 | Bluish red |

EXAMPLE 60

140 g of a lignin sulfonic acid-formaline condensation product and 650 g of water were mixed to 60 g of a disperse dye mixture comprising 25% by weight of a monoazo dye of the following formula (1-60) and 75% by weight of a monoazo dye of the following formula (2-60), and the mixture was pulverized in a wet system by a sand grinder, followed by spray drying.

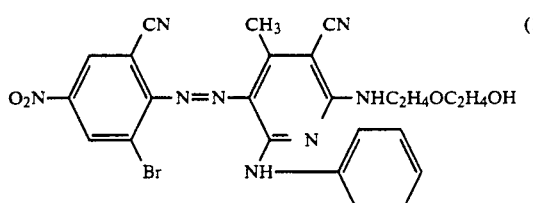
(1-60)

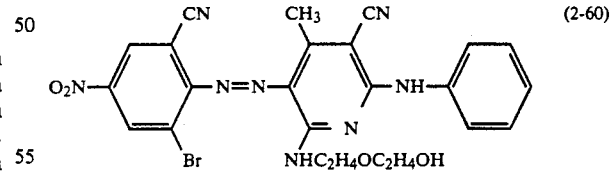
(2-60)

To 0.09 g of this powdery disperse dye mixture, 0.08 g of a nonionic leveling agent (Diaserver® LR-PSL, manufactured by Mitsubishi Kasei Corporation), 0.10 g of an ultraviolet absorber (Sunlife LP-100, tradename, manufactured by Nikka Kagaku K.K.) and 150 ml of water were added, and the resulting dye bath was adjusted to pH5.5. To this dye bath, 5 g of a polyester cloth was introduced and subjected to exhaustion dyeing at 130° C. for one hour, followed by soaping, washing with water and drying to obtain a bluish red dyed cloth.

The light-fastness of this dyed cloth was measured by a JIS testing method (JIS L-0843) modified for testing automobile seats (the temperature was 89° C.±5° C., a soft polyurethane foam (10 mm) was lined on the rear side of the sample cloth, and the light-fastness was evaluated by the color fading scale stipulated in JIS) and found to be grade 4-5.

EXAMPLE 61

150 ml of water was added to 0.5 g of a powdery disperse dye mixture prepared in accordance with Example 60, and the resulting dye bath was adjusted to pH7. To this dye bath, 5 g of a fine denier polyester cloth (yarn size: 0.8 denier) was introduced and subjected to exhaustion dyeing at 135° C. for 60 minutes, followed by reduction cleaning, washing with water and drying by conventional methods to obtain a bluish red dyed cloth. The light-fastness of this dyed cloth was grade 6 (JIS L-0843 method: 40 hr).

EXAMPLE 62

140 g of a lignin sulfonic acid-formaline condensation product and 650 g of water were mixed to a mixture comprising 30 g of a yellow disperse dye of the formula (4) wherein $R^4$ is H, 20 g of a red disperse dye mixture comprising 40 parts by weight of a dye of the formula (1-1) in Example 1 and 60 parts by weight of a dye of the formula (2-1) in Example 1 and 18 g of a blue disperse dye of the following formula (8-1), and the mixture was pulverized in a wet system by a sand grinder, followed by spray-drying.

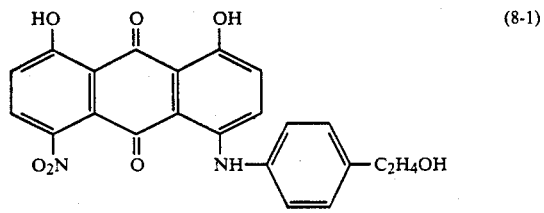
(8-1)

To 0.085 g of this powdery disperse dye composition, 0.08 g of a nonionic leveling agent (Diaserver ® LR-PSL, manufactured by Mitsubishi Kasei Corporation), 0.10 g of an ultraviolet absorber (Sunlife LP-100, tradename, manufactured by Nikka Kagaku K.K.) and 150 ml of water were added. The resulting dye bath was adjusted to pH5.5. To this dye bath, 5 g of a polyester cloth was introduced and subjected to exhaustion dyeing at 130° C. for one hour, followed by soaping, washing with water and drying to obtain a brown dyed cloth.

The light-fastness of this dyed cloth was measured by a JIS test method (JIS L-0843) modified for testing automobile seats (the temperature was 89° C.+5° C., a soft polyurethane foam (10 mm) was lined on the rear side of the sample cloth, and the light-fastness was evaluated by the color fading scale stipulated in JIS) and found to be grade 4-5.

Further, with respect to the sublimation fastness, a polyester white cloth was sandwiched between the dyed cloths and contacted at 180° C. for 30 minutes, whereupon the staining of the white cloth was evaluated by a gray scale and found to be grade 4.

COMPARATIVE EXAMPLE 62

Dyeing was conducted in the same manner as in Example 62 except that the red component was changed from the red disperse dye mixture of the dyes of the formulas (1-1) and (2-1) in Example 1 to 95 g of a disperse dye of the above formula (F) to obtain a brown dyed cloth. Evaluation was conducted in the same manner as in Example 62, whereby the light-fastness was grade 2, and the sublimation fastness was grade 3.

EXAMPLES 63 TO 73

A polyester cloth was dyed in the same manner as in Example 62 except that in Example 62, the yellow disperse dye was changed to the dye identified in the following Table 6, followed by evaluation. The hue, light-fastness and sublimation fastness of the dyed cloth are shown in Table 6.

TABLE 6

| Example No. | Yellow disperse dye | Light-fastness (grade) | Sublimation fastness (grade) | Hue |
|---|---|---|---|---|
| 63 | ![structure: 2,6-dichloro-4-nitrophenyl azo carbazole with C2H4OH] | 4 | 4-5 | Brown |
| 64 | ![structure: anthraquinone with S-N ring and NHCO-phenyl-Cl] | 4-5 | 4-5 | Brown |

TABLE 6-continued
| Example No. | Yellow disperse dye | Light-fastness (grade) | Sublimation fastness (grade) | Hue |
|---|---|---|---|---|
| | 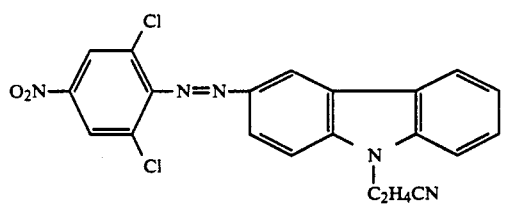 (Weight ratio: 1/1) | | | |
| 65 | 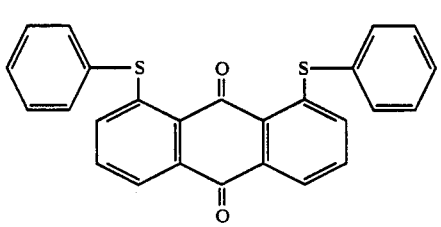 | 4-5 | 4-5 | Brown |
| 66 | 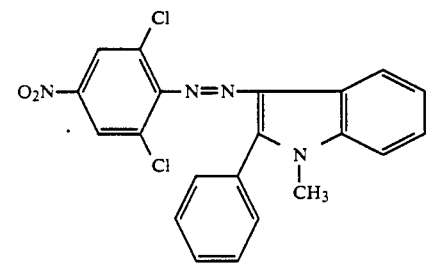 | 4 | 4 | Brown |
| 67 | 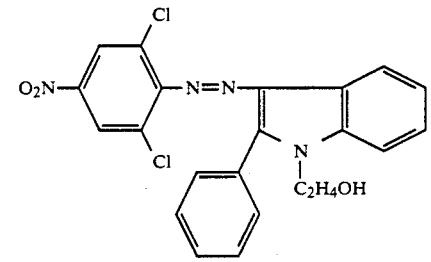 | 4 | 4 | Brown |
| 68 | 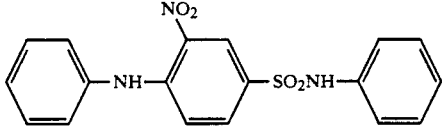 | 4-5 | 4 | Brown |
| 69 | 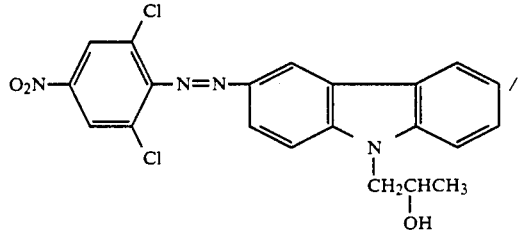 | 4-5 | 4-5 | Brown |

TABLE 6-continued

| Example No. | Yellow disperse dye | Light-fastness (grade) | Sublimation fastness (grade) | Hue |
|---|---|---|---|---|
| | 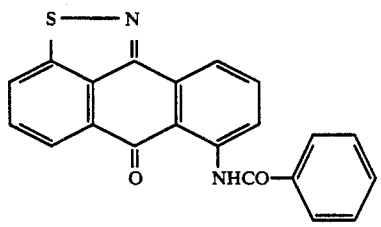 (Weight ratio: 1/1) | | | |
| 70 | 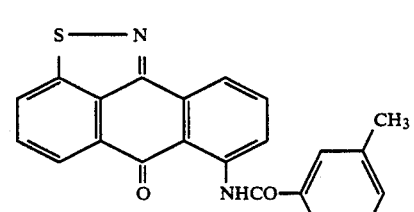 | 4-5 | 4-5 | Brown |
| 71 | 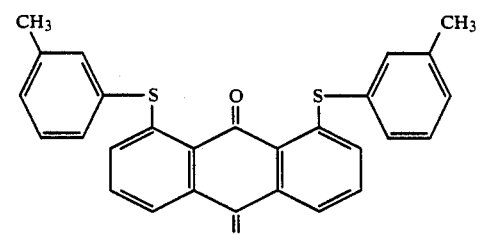 | 4-5 | 4-5 | Brown |
| 72 | 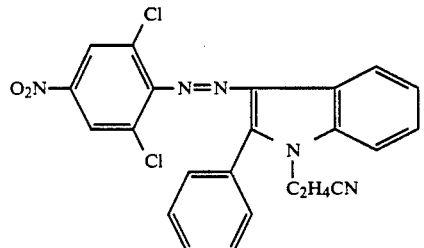 | 4+ | 4-5 | Brown |
| 73 | 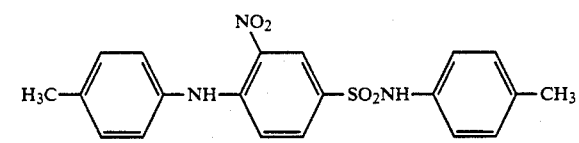 | 4-5 | 4+ | Brown |

EXAMPLES 74 TO 80

A polyester cloth was dyed in the same manner as in Example 62 except that in Example 62, the blue disperse dye was changed to the dye identified in the following Table 7, and the hue, light-fastness and sublimation fastness of the dyed cloth are shown in Table 7.

TABLE 7

| Example No. | Blue disperse dye | Light-fastness (grade) | Sublimation fastness (grade) | Hue |
|---|---|---|---|---|
| 74 | 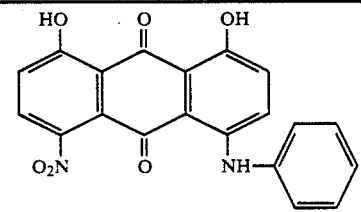 | 4-5 | 4 | Brown |

TABLE 7-continued

| Example No. | Blue disperse dye | Light-fastness (grade) | Sublimation fastness (grade) | Hue |
|---|---|---|---|---|
| 75 | [anthraquinone imide structure with NH₂ groups and NC₃H₆OCH₃] / [anthraquinone with OH and NH-C₆H₄-OSO₂CH₃] (Weight ratio: 3/1) | 4-5 | 4 | Brown |
| 76 | [anthraquinone with HO, OH, O₂N, NH-phenyl] / [anthraquinone with HO, OH, O₂N, NH-phenyl] (Weight ratio: 1/1) | 4-5 | 4 | Brown |
| 77 | [anthraquinone imide with NH₂ groups and NC₂H₄OC₂H₄OCH₃] | 4-5 | 4 | Brown |
| 78 | [anthraquinone with HO, OH, O₂N, NH-(2-Cl-phenyl)] | 4-5 | 4-5 | Brown |
| 79 | [anthraquinone with HO, OH, O₂N, NH-(3-OH-phenyl)] | 4-5 | 4-5 | Brown |

TABLE 7-continued

| Example No. | Blue disperse dye | Light-fastness (grade) | Sublimation fastness (grade) | Hue |
|---|---|---|---|---|
| 80 | (structure: 1,8-dihydroxy-4-nitro-5-anilino anthraquinone) | 4–5 | 4 | Brown |

EXAMPLES 81 TO 83

A polyester cloth was dyed in the same manner as in at in Example 62, the blending ratio (weight ratio) of the dyes of the formulas (1-1) and (2-1) in the red disperse dye mixture was changed as identified in the following Table 8, followed by evaluation. The results are shown in Table 8.

TABLE 8

| Example No. | (1-1):(2:1) | Light-fastness (grade) | Sublimation fastness (grade) | Hue |
|---|---|---|---|---|
| 81 | 30:70 | 4–5 | 4 | Brown |
| 82 | 10:90 | 4–5 | 4 | Brown |
| 83 | 50:50 | 4–5 | 4 | Brown |

EXAMPLE 84

150 ml of water was added to 0.25 g of a powdery disperse dye composition prepared in the same manner as in Example 62, and the resulting dye bath was adjusted to pH 8.2. To this dye bath, 5 g of a fine denier polyester cloth (yarn size: 0.8 denier) was introduced and subjected to exhaustion dyeing at 135° C. for 60 minutes, followed by reduction cleaning, washing with water and drying in accordance with conventional methods to obtain a dark red dyed cloth. The light-fastness of this dyed cloth (JIS L-0843 method: 40 hr) was grade 6 (blue scale).

EXAMPLES 85 TO 88

A polyester cloth was dyed in the same manner as in Example 62 except that in Example 62, the amounts of the yellow, red and blue dye components were changed to the proportions as identified in the following Table 9, followed by evaluation. The results are shown in Table 9.

TABLE 9

| Example No. | Yellow dye (g) | Red dye (g) | Blue dye (g) | Light-fastness (grade) | Sublimation fastness (grade) | Hue |
|---|---|---|---|---|---|---|
| 85 | 6 | 20 | 18 | 4–5 | 4–5 | Violet |
| 86 | 100 | 20 | 18 | 4–5 | 4– | Dark yellow |
| 87 | 30 | 20 | 6 | 4–5 | 4 | Yellow brown |
| 88 | 30 | 20 | 100 | 4–5 | 4 | Dark blue |

EXAMPLE 89

Dyeing was conducted in the same manner as in Example 62 except that in Example 62, the red disperse dye mixture comprising the dye of the formula (1-1) and the dye of the formula (2-1), was changed to 20 g of a red disperse dye mixture comprising 40% by weight of a monoazo dye of the formula (1) wherein $X^1$ is $-NO_2$, $Y^1$ is $-CN$, $Z^1$ is H, $R^1$ is $-C_3H_6OC_2H_4OCH_3$, and $W^1$ is H and 60% by weight of a monoazo dye of the formula (2) wherein $X^2$ is $-NO_2$, $Y^2$ is $-CN$, $Z^2$ is H, $R^2$ is $-C_3H_6OC_2H_4OCH_3$ and $W^2$ is H, to obtain a brown dyed cloth. The light-fastness and sublimation fastness were evaluated in the same manner as in Example 62. The results are shown in Table 10.

COMPARATIVE EXAMPLE 89

Dyeing was conducted in the same manner as in Example 89 except that the red component was changed to 47.5 g of a disperse dye of the above formula (F), to obtain a brown dyed cloth. The light-fastness and sublimation fastness were evaluated in the same manner as in Example 62. The results are shown in Table 10.

TABLE 10

|  | Light-fastness | Sublimation fastness |
|---|---|---|
| Example 89 | Grade 4–5 | Grade 4 |
| Comparative Example 89 | Grade 2 | Grade 3 |

EXAMPLES 90 TO 96

A polyester cloth was dyed in the same manner as in Example 89 except that in Example 89, the yellow disperse dye was changed to a yellow disperse dye identified in Table 11, followed by evaluation. The hue, light-fastness and sublimation fastness of the dyed cloth are shown in Table 11.

TABLE 11

| Example No. | Yellow disperse dye | Light-fastness (grade) | Sublimation fastness (grade) | Hue |
|---|---|---|---|---|
| 90 | Same as in Example 63 | 4 | 4–5 | Brown |
| 91 | Same as in Example 64 | 4–5 | 4–5 | Brown |
| 92 | Same as in Example 65 | 4–5 | 4–5 | Brown |
| 93 | Same as in Example 66 | 4 | 4 | Brown |
| 94 | Same as in Example 67 | 4 | 4 | Brown |
| 95 | Same as in Example 68 | 4–5 | 4 | Brown |
| 96 | Same as in Example 69 | 4–5 | 4–5 | Brown |

EXAMPLES 97 TO 100

A polyester cloth was dyed in the same manner as in Example 89 except that in Example 89, the blue disperse dye was changed to a blue disperse dye identified in Table 12, followed by evaluation. The hue, light-fastness and sublimation fastness of the dyed cloth are shown in Table 12.

TABLE 12

| Example No. | Blue disperse dye | Light-fastness (grade) | Sublimation fastness (grade) | Hue |
|---|---|---|---|---|
| 97 | Same as in Example 74 | 4–5 | 4 | Brown |
| 98 | Same as in Example 75 | 4–5 | 4 | Brown |
| 99 | Same as in Example 76 | 4–5 | 4 | Brown |
| 100 | Same as in Example 77 | 4–5 | 4 | Brown |

EXAMPLES 101 TO 108

A polyester cloth was dyed in the same manner as in Example 62 except that in Example 62, the red disperse dye mixture was changed to a red disperse dye mixture (blending ratio of (1):(2)=4:6 (weight ratio)) identified in Table 13, followed by evaluation. The hue, light-fastness and sublimation fastness of the dyed cloth are shown in Table 13.

TABLE 13

| Example No. | Structural formulas of red disperse dyes | Light-fastness (grade) | Sublimation fastness (grade) | Hue |
|---|---|---|---|---|
| 101 | [1] 2-CN-4-$O_2N$-phenyl–N=N–[pyridine ring with $CH_3$, CN, –$NHC_2H_4OC_2H_4OCC_2H_5$ (=O), and NH–phenyl]  [2] 2-CN-4-$O_2N$-phenyl–N=N–[pyridine ring with $CH_3$, CN, –NH–phenyl, and –$NHC_2H_4OC_2H_4OCC_2H_5$ (=O)] | 4–5 | 4 | Brown |
| 102 | [1] 2-Cl-4-$O_2N$-phenyl–N=N–[pyridine ring with $CH_3$, CN, –$NHC_2H_4OC_2H_4OH$, and NH–phenyl]  [2] 2-Cl-4-$O_2N$-phenyl–N=N–[pyridine ring with $CH_3$, CN, –NH–phenyl, and –$NHC_2H_4OC_2H_4OH$] | 4–5 | 4 | Brown |
| 103 | [1] 2-CN-4-$O_2N$-6-Br-phenyl–N=N–[pyridine ring with $CH_3$, CN, –$NHC_2H_4OC_2H_4OH$, and NH–phenyl]  [2] 2-CN-4-$O_2N$-6-Br-phenyl–N=N–[pyridine ring with $CH_3$, CN, –NH–phenyl, and –$NHC_2H_4OC_2H_4OH$] | 4–5 | 4 | Brown |

TABLE 13-continued
| Example No. | | Structural formulas of red disperse dyes | Light-fastness (grade) | Sublimation fastness (grade) | Hue |
|---|---|---|---|---|---|
| 104 | [1] | 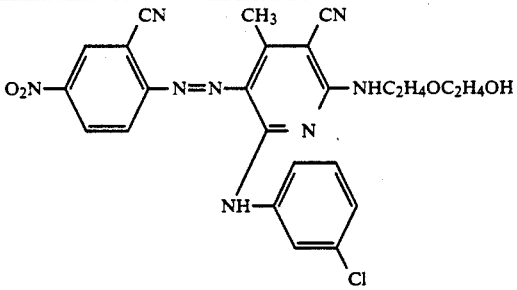 | 4–5 | 4 | Brown |
| | [2] | | | | |
| 105 | [1] | | 4–5 | 4 | Brown |
| | [2] | | | | |
| 106 | [1] | 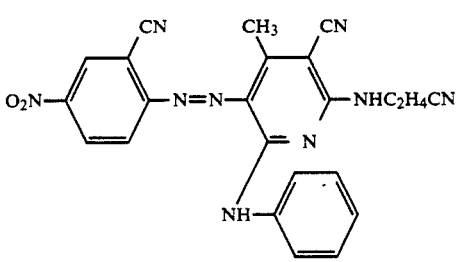 | 4–5 | 4 | Brown |
| | [2] | | | | |
| 107 | [1] | 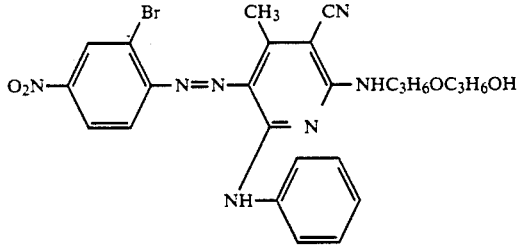 | 4–5 | 4 | Brown |

TABLE 13-continued

| Example No. | Structural formulas of red disperse dyes | Light-fastness (grade) | Sublimation fastness (grade) | Hue |
|---|---|---|---|---|
| | [2] $O_2N-\text{C}_6H_3(CN)-N=N-\text{C}(CH_3)=\text{C}(CN)-\text{C}(NHC_6H_5)=\text{C}(NHC_2H_4OCC_3H_7)-N$ (with carbonyl) | | | |
| 108 | [1] $O_2N-\text{C}_6H_3(CN)-N=N-\text{C}(CH_3)=\text{C}(CN)-\text{C}(NHC_2H_4OC_2H_4OC_2H_4OH)=\text{C}(NH-C_6H_5)-N$ | 4–5 | 4 | Brown |
| | [2] $O_2N-\text{C}_6H_3(CN)-N=N-\text{C}(CH_3)=\text{C}(CN)-\text{C}(NH-C_6H_5)=\text{C}(NHC_2H_4OC_2H_4OC_2H_4OH)-N$ | | | |

EXAMPLE 109

140 g of a lignin sulfonic acid-formaline condensation product and 650 g of water were added to a mixture comprising 50% by weight of a dye of the formula (1-1) in Example 1 and 50% by weight of a dye of the formula (2-1) in Example 1 and 15 g of a red disperse dye of the following formula (12-1), and the mixture was pulverized in a wet system by a sand grinder, followed by spray drying.

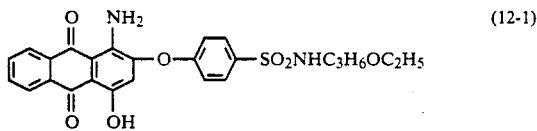

(12-1)

To 0.085 g of this powdery disperse dye composition, 0.08 g of a nonionic leveling agent (Diaserver ® LR-PSL, manufactured by Mitsubishi Kasei Corporation), 0.10 g of an ultraviolet absorber (Sunlife LP-100, tradename, manufactured by Nikka Kagaku K.K.) and 150 ml of water were added, and the resulting dye bath was adjusted to pH 5.5. To this dye bath, 5 g of a polyester cloth was introduced and subjected to exhaustion dyeing at 130° C. for one hour, followed by soaping, washing with water and drying to obtain a red dyed cloth.

The light-fastness of this dyed cloth was measured by a JIS test method (JIS L-0843) modified for testing automobile seats (the temperature was 89° C.±5° C., a soft polyurethane foam (10 mm) was lined on the rear side of the sample cloth, and the light-fastness was evaluated by a color fading scale stipulated in JIS). With respect to the sublimation fastness, a polyester white cloth was sandwiched between the dyed cloths and contacted at 180° C. for 30 seconds, whereupon the staining of the white cloth was evaluated by a gray scale. The results are shown in Table 14.

COMPARATIVE EXAMPLES 109 to 111

Dyeing was conducted in the same manner as in Example 109 except that the red disperse dye of the formula (12-1) was changed to one of the following dyes (H) to (J), whereby a red dyed cloth was obtained.

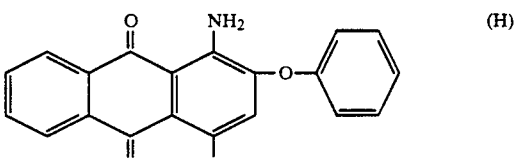

(H)

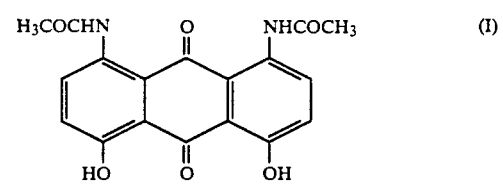

(I)

(J)

The light-fastness and sublimation fastness were measured in the same manner as in Example 109. The results are shown in Table 14.

TABLE 14

| | Light-fastness (grade) | Sublimation fastness (grade) |
|---|---|---|
| Example 109 | 4–5 | 5⁻ |
| Comparative Example 109 | 4 | 2–3 |

TABLE 14-continued

|  | Light-fastness (grade) | Sublimation fastness (grade) |
|---|---|---|
| Comparative Example 110 | 3 | 2-3 |
| Comparative Example 111 | 2-3 | 5⁻ |

EXAMPLES 110 to 117

A polyester cloth was dyed in the same manner as in Example 109 except that in Example 109, the red disperse dye of the formula (12-1) was changed to a red disperse dye identified in Table 15. The hue, light-fastness and sublimation fastness of the dyed cloth are shown in Table 15.

TABLE 15

| Example No. | Red disperse dye | Light-fastness (grade) | Sublimation fastness (grade) | Hue |
|---|---|---|---|---|
| 110 | [1-amino-2-($OC_6H_{12}OH$)-4-hydroxyanthraquinone] | 4-5 | 4 | Red |
| 111 | [1-amino-2-($OC_2H_4OC(O)OCH_3$)-4-hydroxyanthraquinone / 1-amino-2-($O-C_2H_4OC(O)O$-phenyl)-4-hydroxyanthraquinone] (Weight ratio: 1/1) | 4-5 | 3-4 | Red |
| 112 | [1-amino-2-($OC_2H_4O$-phenyl)-4-hydroxyanthraquinone] | 4-5 | 4 | Red |
| 113 | [1-amino-2-(O-(2-methyl-4-$C_2H_4COOCH_3$-phenyl))-4-hydroxyanthraquinone] | 4-5 | 4 | Red |
| 114 | [1-amino-4-($NHSO_2$-p-tolyl)anthraquinone] | 4-5⁺ | 4 | Red |
| 115 | [1-amino-2-(O-phenyl-4-$CH_2$-N(hexamethyleneimide))-4-hydroxyanthraquinone] | 4-5 | 5⁻ | Red |

TABLE 15-continued

| Example No. | Red disperse dye | Light-fastness (grade) | Sublimation fastness (grade) | Hue |
|---|---|---|---|---|
| 116 | 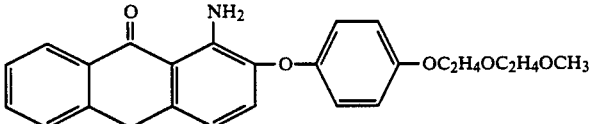 | 4-5 | 3-4 | Red |
| 117 | 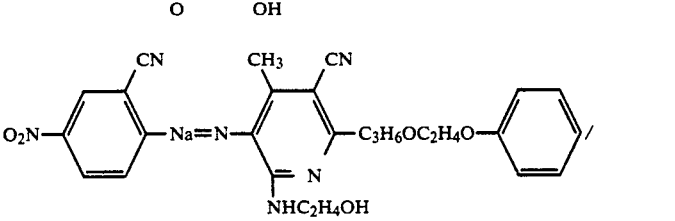<br>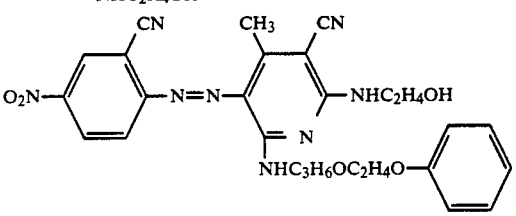<br>(Weight ratio: 1/1) | 5⁻ | 5⁻ | Red |

EXAMPLES 118 TO 120

A polyester cloth was dyed in the same manner as in Example 109 except that the blending ratio of the dye of the formula (1-1) to the dye of the formula (2-1) in the red disperse dye mixture used in Example 109 was changed, followed by evaluation. The results are shown in Table 16.

TABLE 16

| Example No. | (1-1):(2:1) | Light-fastness (grade) | Sublimation fastness (grade) | Hue |
|---|---|---|---|---|
| 118 | 30%:70% | 4-5 | 4-5 | Red |
| 119 | 10%:90% | 4-5 | 4-5 | Red |
| 120 | 60%:40% | 4-5 | 4-5 | Red |

EXAMPLES 121 AND 122

Dyeing was conducted in the same manner as in Example 109 except that the amount of the red disperse dye of the formula (12-1) in Example 109 was changed to 1.5 g or 30 g, followed by evaluation. The results are shown in Table 17.

TABLE 17

| Example No. | Amount of the disperse dye of the formula (12-1) (g) | Light-fastness (grade) | Sublimation fastness (grade) | Hue |
|---|---|---|---|---|
| 121 | 1.5 | 4-5 | 4-5 | Red |
| 122 | 30 | 4-5⁻ | 4-5 | Red |

EXAMPLE 123

150 ml of water was added to 0.25 g of a powdery dispersed dye mixture prepared in accordance with Example 109, and the resulting dye bath was adjusted to pH8.2. To this dye bath, 5 g of a fine denier polyester cloth (yarn size: 0.8 denier) was introduced and subjected to exhaustion dyeing at 135° C. for 60 minutes, followed by reduction cleaning, washing with water and drying in accordance with conventional methods, to obtain a red dyed cloth. The light-fastness of this dyed cloth (JIS L-0843 method: 40 hr) was grade 6 (blue scale).

EXAMPLES 124 TO 141

Dyeing was conducted in the same manner as in Example 109 except that in Example 109, the red dye mixture comprising a dye of the (1-1) and a dye of the formula (2-1) was changed to a red dye mixture comprising a dye of the formula (1') and a dye of the formula (2'), followed by evaluation. The results are shown in Table 18. In the cases in Table 18, $X^1$ and $X^2$, $Y^1$ and $Y^2$, $Z^1$ and $Z^2$, and $W^1$ and $W^2$ in the formulas (1) and (2) are the same, respectively. Accordingly, in the formulas (1') and (2') in Table 18, they were simply represented by X, Y, Z and W. Further, the blending ratio of the dye of the formula (1') and the dye of the formula (2') was 1:1 (weight ratio).

TABLE 18

Structure (1'):
X-(phenyl with Y, Z)-N=N-C(=C(CH3)-C(CN)=C(NHR¹)-N=)-C(-NH-phenyl-W)

Structure (2'):
X-(phenyl with Y, Z)-N=N-C(=C(CH3)-C(CN)=C(NH-phenyl-W)-N=)-C(NHR²)

| Example No. | X,Y,Z phenyl group | —R¹ = —R² | —NH-phenyl-W | Light-fastness (grade) | Sublimation fastness (grade) | Hue |
|---|---|---|---|---|---|---|
| 124 | 2-CN, 4-O$_2$N | —C$_2$H$_4$OC$_2$H$_4$OC(=O)C$_2$H$_5$ | —NH—C$_6$H$_5$ | 4-5 | 5⁻ | Red |
| 125 | 2-CN, 4-O$_2$N | —C$_3$H$_6$OC$_2$H$_4$OCH$_3$ | —NH—C$_6$H$_5$ | 4-5 | 5⁻ | Red |
| 126 | 2-CN, 4-O$_2$N | —C$_3$H$_6$OC$_3$H$_7$ | —NH—C$_6$H$_5$ | 4-5 | 5⁻ | Red |
| 127 | 2-CN, 4-O$_2$N | —C$_3$H$_6$CN | —NH—C$_6$H$_4$—3-Cl | 4-5⁺ | 5⁻ | Yellowish red |
| 128 | 2-CN, 4-O$_2$N | —C$_3$H$_6$OC(=O)C$_2$H$_5$ | —NH—C$_6$H$_5$ | 4-5 | 5⁻ | Red |
| 129 | 2-Cl, 4-O$_2$N | —C$_3$H$_6$OCH$_3$ | —NH—C$_6$H$_5$ | 4-5⁻ | 4⁺ | Yellowish red |
| 130 | 2-Br, 4-O$_2$N | —C$_3$H$_6$OC$_3$H$_6$OC(=O)H | —NH—C$_6$H$_4$—4-OC$_2$H$_5$ | 4-5⁻ | 4-5 | Yellowish red |
| 131 | 2-CN, 4-O$_2$N, 5-Br | —C$_2$H$_4$Cl | —NH—C$_6$H$_5$ | 4-5⁻ | 5⁻ | Bluish Red |

TABLE 18-continued

Structure (1'):
X-(phenyl with Y ortho-up, Z ortho-down)-N=N-C(=C(CH3)-C(CN)=C(NHR¹)-N=)-C(-NH-Ar(W))

Structure (2'):
X-(phenyl with Y, Z)-N=N-C(=C(CH3)-C(CN)=C(NH-Ar(W)))-C(NHR²)=N-

| Example No. | X-phenyl (Y, Z) | —R¹ = —R² | —NH—Ar(W) | Light-fastness (grade) | Sublimation fastness (grade) | Hue |
|---|---|---|---|---|---|---|
| 132 | Y=CN, X=O₂N, Z=Br | —C₃H₆OC₃H₇(i) | W=CH₃ (ortho) | 4–5⁻ | 5⁻ | Bluish red |
| 133 | Y=SO₂CH₃, X=O₂N | —C₄H₈OCH₃ | W=H | 4–5 | 5⁻ | Red |
| 134 | Y=SO₂CH₃, X=O₂N, Z=Cl | —C₃H₇(n) | W=H | 4–5⁻ | 5⁻ | Bluish red |
| 135 | Y=NO₂, X=O₂N | —C₂H₄OC₂H₄OH | W=Br | 4–5⁻ | 5⁻ | Red |
| 136 | Y=CF₃, X=O₂N | —C₂H₄OC₂H₄OCCH₃ (O=) | W=H | 4–5 | 5⁻ | Red |
| 137 | Y=Cl, X=O₂N, Z=Cl | —C₂H₄OC₂H₄OC₂H₅ | W=H | 4–5⁻ | 4–5⁺ | Yellowish red |
| 138 | Y=CF₃, X=O₂N, Z=CN | —C₄H₈OCCH₃ (O=) | W=H | 4–5 | 5⁻ | bluish red |

TABLE 18-continued

| Example No. | X, Y, Z (structure) | —R¹ = —R² | —NH-phenyl-W | Light-fastness (grade) | Sublimation fastness (grade) | Hue |
|---|---|---|---|---|---|---|
| 139 | O₂N—, SO₂CH₃, SO₂CH₃ | —C₂H₄OC₂H₄OH | —NH—C₆H₅ | 4–5 | 5⁻ | Dark Red |
| 140 | O₂N—, CN, CN | —C₂H₄OC₂H₄OH | —NH—C₆H₅ | 4–5 | 5⁻ | Bluish Red |
| 141 | CH₃SO₂—, NO₂ | —C₂H₄OC₂H₄OH | —NH—C₆H₅ | 4–5⁻ | 5⁻ | Yellowish Red |

We claim:

1. A disperse dye mixture comprising a monoazo dye of the following formula (1) and a monoazo dye of the following formula (2) blended thereto in a ratio of from 1:9 to 7:3 by weight:

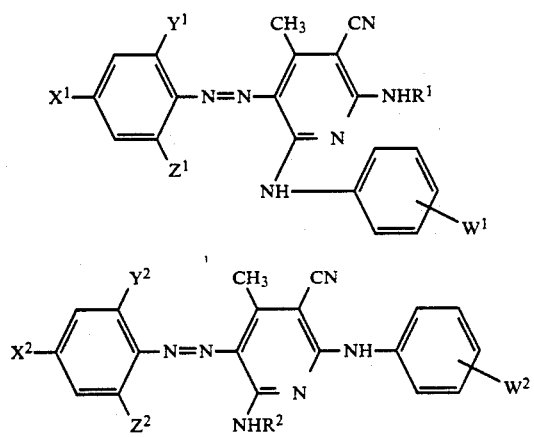

wherein each of $X^1$ and $X^2$ which are independent of each other, is nitro, cyano, sulfomethyl or halogen, each of $Y^1$, $Y^2$, $Z^1$ and $Z^2$ which are independent of one another, is hydrogen, cyano, nitro, trifluoromethyl, halogen or sulfomethyl, each of $W^1$ and $W^2$ which are independent of each other, is hydrogen, halogen, $C_1$–$C_2$ alkyl or alkoxy, and each of $R^1$ and $R^2$ which are independent of each other, is $C_1$–$C_4$ alkyl, or $C_2$–$C_4$ alkyl which is substituted by cyano, halogen, hydroxy, hydroxyalkoxy, $C_1$–$C_4$ alkoxy, hydroxyalkoxyalkoxy, acyloxyalkoxy, acyloxyalkoxyalkoxy or alkoxyalkoxy.

2. The disperse dye mixture according to claim 1, wherein in the formulas (1) and (2), $X^1$ and $X^2$ are nitro.

3. The disperse dye mixture according to claim 1, wherein in the formulas (1) and (2), $X^1$ and $X^2$ are nitro, $Y^1$ and $Y^2$ are cyano or halogen, and $Z^1$ and $Z^2$ are hydrogen.

4. The disperse dye mixture according to claim 1, wherein in the formulas (1) and (2), $W^1$ and $W^2$ are hydrogen.

5. The disperse dye mixture according to claim 1, wherein in the formulas (1) and (2), and are $R^1$ and $R^2$ hydroxyethoxyethyl.

6. The disperse dye mixture according to claim 1, wherein the monoazo dye of the formula (2) is blended in an amount of from 0.43 to 4 times by weight of the monoazo dye of the formula (1).

7. A disperse dye mixture comprising 100 parts by weight of the mixture of a monoazo dye of the formula (1) and a monoazo dye of the formula (2) as defined in claim 1:

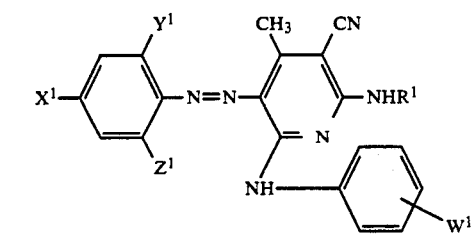

(1)

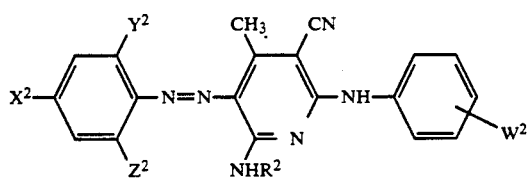

(2)

wherein
each of $X^1$ and $X^2$ which are independent of each other, is nitro, cyano, sulfomethyl or halogen, each of $Y^1$, $Y^2$, $Z^1$ and $Z^2$ which are independent of one another, is hydrogen, cyano, nitro, trifluoromethyl, halogen or sulfomethyl, each of $W^1$ and $W^2$ which are independent of each other, is hydrogen, halogen, $C_1$-$C_2$ alkyl or alkoxy, and each of $R^1$ and $R^2$ which are independent of each other, is $C_1$-$C_4$ alkyl, or $C_2$-$C_4$ alkyl which is substituted by cyano, halogen, hydroxy, hydroxyalkoxy, $C_1$-$C_4$ alkoxy, hydroxyalkoxyalkoxy, acyloxyalkoxy, acyloxyalkoxyalkoxy or alkoxyalkoxy; and at least one disperse dye selected from the group consisting of
(a) a combination of at least one yellow disperse dye selected from the group consisting of dyes of the following formulas (3) to (7) and at least one blue disperse dye selected from the group consisting of dyes of the following formulas (8) to (10):

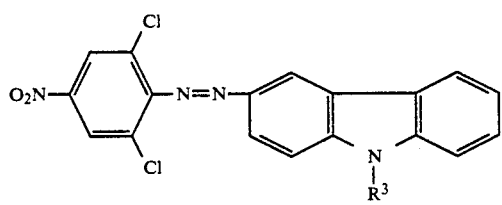

(3)

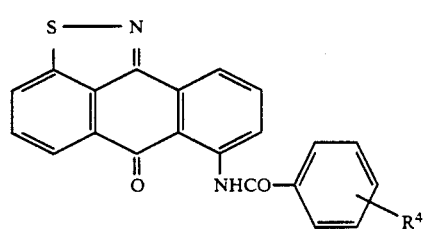

(4)

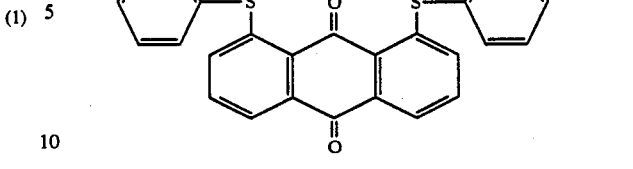

(5)

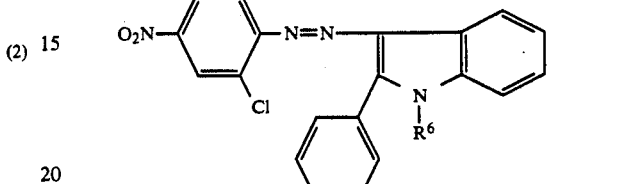

(6),

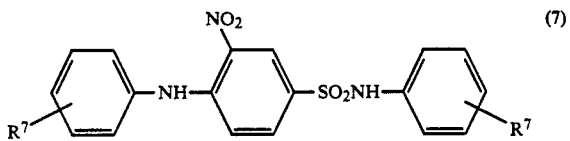

(7)

wherein $R^3$ in the formula (3) is $C_2$-$C_3$ alkyl which is substituted by hydroxy or cyano, $R^4$ in the formula (4) is hydrogen, methyl or hydrogen, $R^5$ in the formula (5) is hydrogen or methyl, $R^6$ in the formula (6) is $C_1$-$C_3$ alkyl which is unsubstituted or substituted by hydroxy or cyano, and $R^7$ in the formula (7) is hydrogen or $C_1$-$C_2$ alkyl;

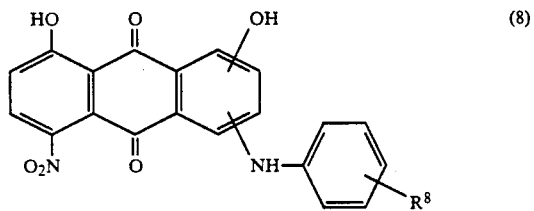

(8)

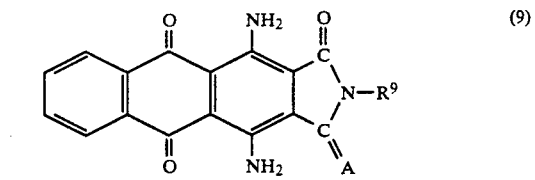

(9)

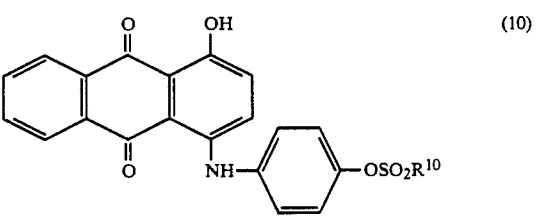

(10)

wherein $R^8$ in the formula (8) is hydrogen, halogen, hydroxy or hydroxy $C_2$-$C_3$ alkyl, A in the formula (9) is oxygen or —NH—, $R^9$ in the formula (9) is lower alkoxy lower alkyl or lower alkoxy lower alkoxy lower alkyl, and $R^{10}$ in the formula (10) is $C_1$-$C_2$ alkyl, and (b) at least one red disperse dye selected from the group consisting of dyes of the following formulas (11) to (14):

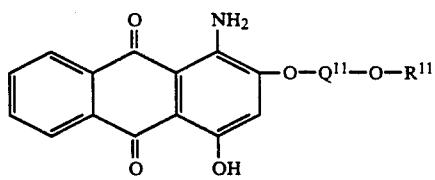

wherein Q$^{11}$ is C$_2$-C$_6$ alkylene, and R$^{11}$ is hydrogen, phenyl,

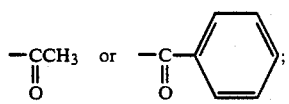

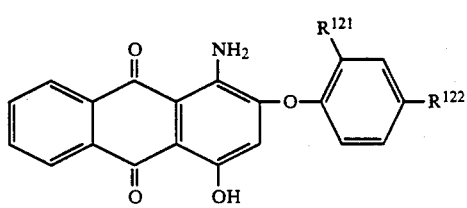

wherein R$^{121}$ is hydrogen or methyl, and R$^{122}$ is

—SO$_2$NHC$_3$H$_6$OC$_2$H$_5$, —C$_2$H$_4$COOCH$_3$ or

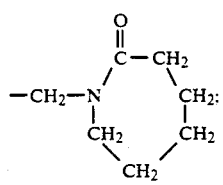

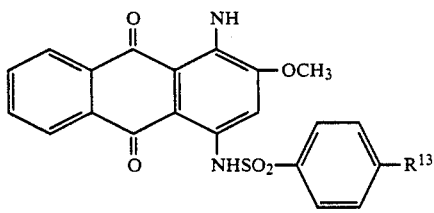

wherein R$^{13}$ is hydrogen or lower alkyl;

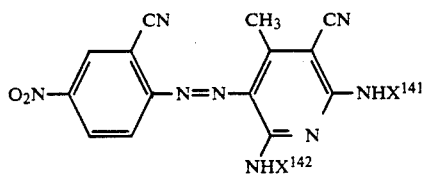

wherein each of X$^{141}$ and X$^{142}$ which are independent of each other, is —Q$^{14}$—OH or —Q$^{1-}$$^{4}$—O—Q$^{14}$—O—R$^{14}$, wherein Q$^{14}$ is C$_2$-C$_3$ alkylene and R$^{14}$ is hydrogen, lower alkyl or phenyl,
wherein said yellow disperse dye and blue disperse dye are each present from 2 to 2,000 parts by weight, wherein said red disperse dye is present from 1 to 100 parts by weight.

8. The disperse dye mixture according to claim 7, wherein the amount of the yellow disperse dye is from 10 to 1,000 parts by weight, and the amount of the blue disperse dye is from 10 to 1,000 parts by weight.

9. The disperse dye mixture according to claim 7, wherein the amount of the yellow disperse dye is from 30 to 500 parts by weight, and the amount of the blue disperse dye is from 30 to 500 parts by weight.

10. The disperse dye mixture according to claim 7, wherein the amount of the red disperse dye selected rom the group consisting of dyes of the formula (11) to (14) is from 20 to 60 parts by weight.

11. Polyester fibers dyed with a disperse dye mixture comprising 100 parts by weight of the mixture of a monoazo dye of the formula (1) and a monoazo dye of the formula (2) as defined in claim 1:

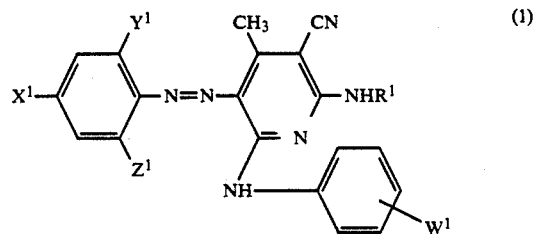

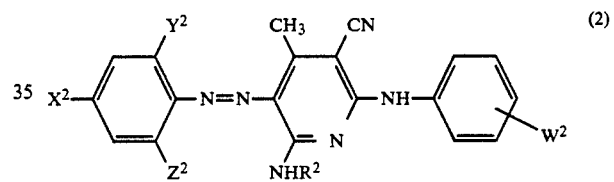

wherein
each of X$^1$ and X$^2$ which are independent of each other, is nitro, cyano, sulfomethyl or halogen, each of Y$^1$, Y$^2$, Z$^1$ and Z$^2$ which are independent of one another, is hydrogen, cyano, nitro, trifluoromethyl, halogen or sulfomethyl, each of W$^1$ and W$^2$ which are independent of each other, is hydrogen, halogen, C$_1$-C$_2$ alkyl or alkoxy, and each of R$^1$ and R$^2$ which are independent of each other, is C$_1$-C$_4$ alkyl, or C$_2$-C$_4$ alkyl which is substituted by cyano, halogen, hydroxy, hydroxyalkoxy, C$_1$-C$_4$ alkoxy, hydroxyalkoxyalkoxy, acyloxyalkoxy, acyloxyalkoxyalkoxy or alkoxyalkoxy, and from 1 to 100 parts by weight of at least one red disperse dye selected from the group consisting of dyes of the following formulas (11) to (14):

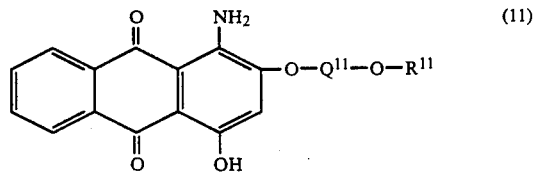

wherein Q$^{11}$ is C$_2$-C$_5$ alkylene, and R$^{11}$ is hydrogen, phenyl,

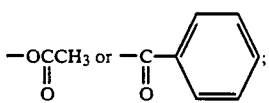

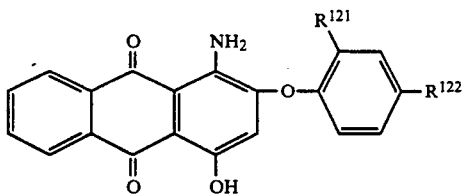
(12)

wherein R¹²¹ is hydrogen or methyl, and R¹²² is

—SO₂NHC₃H₆OC₂H₅, —C₂H₄COOCH₃ or

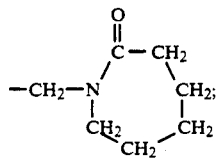

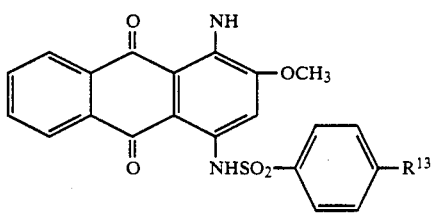
(13)

wherein R¹³ is hydrogen or lower alkyl;

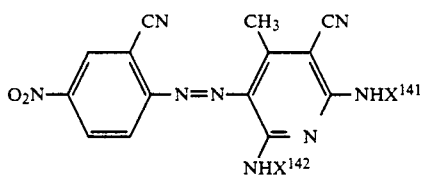
(14)

wherein each of $X^{141}$ and $X^{142}$ which are independent of each other, is —Q¹⁴—OH or —Q¹⁴—O—Q¹⁴—O—R¹⁴, wherein Q¹⁴ is C₂-C₃ alkylene and R¹⁴ is hydrogen, lower alkyl or phenyl.

12. Polyester fibers dyed with a disperse dye mixture comprising 100 parts by weight of the mixture of a monoazo dye of the formula (1) and a monoazo dye of the formula (2) as defined in claim 1:

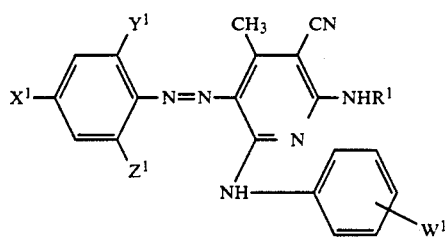
(1)

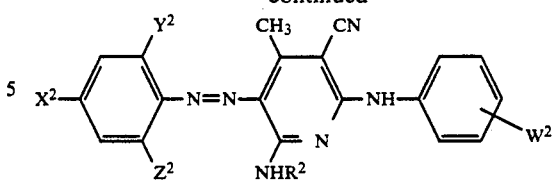
(2)

wherein
each of $X^1$ and $X^2$ which are independent of each other, is nitro, cyano, sulfomethyl or halogen, each of $Y^1$, $Y^2$, $Z^1$ and $Z^2$ which are independent of one another, is hydrogen, cyano, nitro, trifluoromethyl, halogen or sulfomethyl, each of $W^1$ and $W^2$ which are independent of each other, is hydrogen, halogen, C₁-C₂ alkyl or alkoxy, and each of $R^1$ and $R^2$ which are independent of each other, is C₁-C₄ alkyl, or C₂-C₄ alkyl which is substituted by cyano, halogen, hydroxy, hydroxyalkoxy, C₁-C₄ alkoxy, hydroxyalkoxyalkoxy, acyloxyalkoxy, acyloxyalkoxyalkoxy or alkoxyalkoxy, and from 2 to 2,000 parts by weight of at least one yellow disperse dye selected from the group consisting of dyes of the following formulas (3) to (7) and from 2 to 2,000 parts by weight of at least one blue disperse dye selected from the group consisting of dyes of the following formulas (8) to (10):

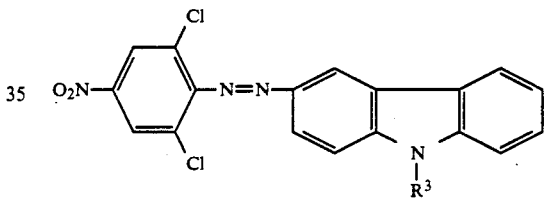
(3)

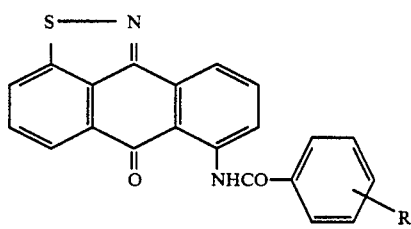
(4)

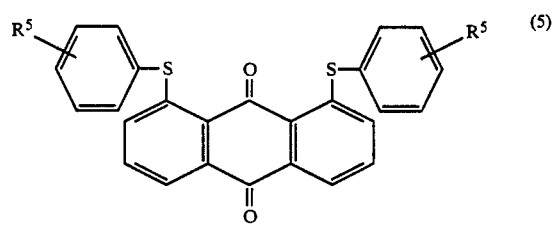
(5)

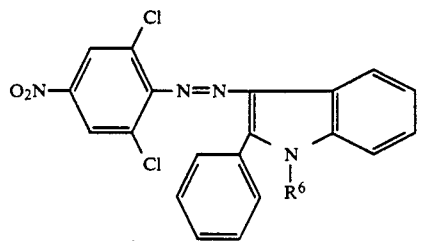
(6)

-continued

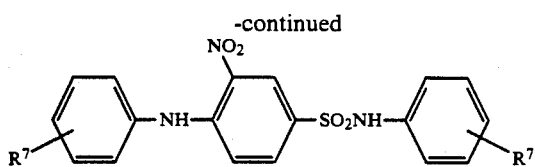
(7)

wherein $R^3$ in the formula (3) is $C_2$-$C_3$ alkyl which is substituted by hydroxy or cyano, $R^4$ in the formula (4) is hydrogen, methyl or halogen, $R^5$ in the formula (5) is hydrogen or methyl, $R^6$ in the formula (6) is $C_1$-$C_3$ alkyl which is unsubstituted or substituted by hydroxy or cyano, and $R^7$ in the formula (7) is hydrogen or $C_1$-$C_2$ alkyl;

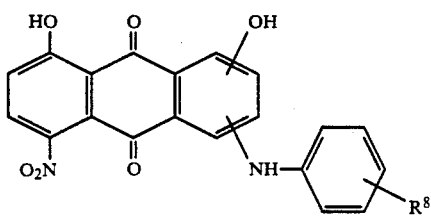
(8)

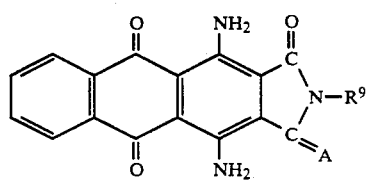
(9)

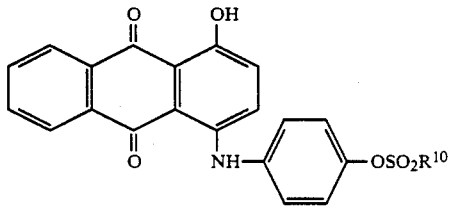
(10)

wherein $R^8$ in the formula (8) is hydrogen, halogen, hydroxy or hydroxy $C_2$-$C_3$ alkyl, A in the formula (9) is oxygen or —NH—, $R^9$ in the formula (9) is lower alkoxy lower alkyl or lower alkoxy lower alkoxy lower alkyl, and $R^{10}$ in the formula (10) is $C_1$-$C_2$ alkyl.

13. Polyester fibers dyed with a disperse dye mixture comprising a monoazo dye of the following formula (1) and a monoazo dye of the following formula (2) blended thereto in a ratio of from 1:9 to 7:3 by weight

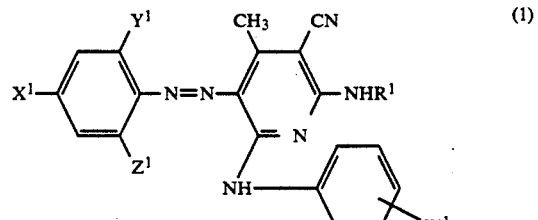
(1)

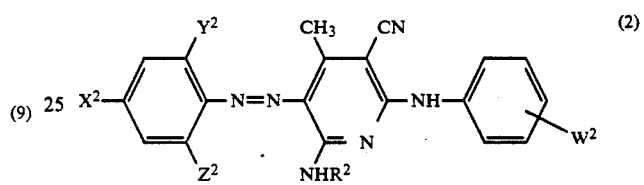
(2)

wherein each of $X^1$ and $X^2$ which are independent of each other, is nitro, cyano, sulfomethyl or halogen, each of $Y^1$, $Y^2$, $Z^1$ and $Z^2$ which are independent of one another, is hydrogen, cyano, nitro, trifluoromethyl, halogen or sulfomethyl, each of $W^1$ and $W^2$ which are independent of each other, is hydrogen, halogen, $C_1$-$C_2$ alkyl or alkoxy, and each of $R^1$ and $R^2$ which are independent of each other, is $C_1$-$C_4$ alkyl, or $C_2$-$C_4$ alkyl which is substituted by cyano, halogen, hydroxy, hydroxyalkoxy, $C_1$-$C_4$ alkoxy, hydroxyalkoxyalkoxy, acyloxyalkoxy, acyloxyalkoxyalkoxy or alkoxyalkoxy.

* * * * *